US012732978B2

(12) United States Patent
Kim et al.

(10) Patent No.: US 12,732,978 B2
(45) Date of Patent: Sep. 8, 2026

(54) ELECTRONIC DEVICE AND METHOD FOR DYNAMIC SPECTRUM SHARING IN WIRELESS COMMUNICATION SYSTEM

(71) Applicant: Samsung Electronics Co., Ltd., Suwon-si (KR)

(72) Inventors: Jinwoo Kim, Suwon-si (KR); Hyoungjoo Lee, Suwon-si (KR); Minho Yang, Suwon-si (KR); Taeyoon Kim, Suwon-si (KR); Euichang Jung, Suwon-si (KR); Chaeman Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 307 days.

(21) Appl. No.: 18/533,757

(22) Filed: Dec. 8, 2023

(65) Prior Publication Data

US 2024/0137921 A1 Apr. 25, 2024
US 2024/0236964 A9 Jul. 11, 2024

Related U.S. Application Data

(63) Continuation of application No. PCT/KR2022/015738, filed on Oct. 17, 2022.

(30) Foreign Application Priority Data

Nov. 3, 2021 (KR) ........................ 10-2021-0149962

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0051* (2013.01); *H04W 24/10* (2013.01); *H04W 76/30* (2018.02)

(58) Field of Classification Search
CPC . H04W 24/10; H04W 76/30; H04W 72/0453; H04L 5/0051
(Continued)

(56) References Cited

U.S. PATENT DOCUMENTS 8,873,413 B2 10/2014 Jang et al.
10,785,692 B2 9/2020 Tsuda et al.
(Continued)

FOREIGN PATENT DOCUMENTS

CN 106332090 B 2/2020
CN 111800794 A 10/2020
(Continued)

OTHER PUBLICATIONS

Extended European Search Report dated Oct. 21, 2024 for EP Application No. 22890222.7.
(Continued)

*Primary Examiner* — Peter G Solinsky
(74) *Attorney, Agent, or Firm* — NIXON & VANDERHYE P.C.

(57) ABSTRACT

An electronic device may include at least one antenna, a wireless communication circuit configured to support a first communication protocol and a second communication protocol, and at least one processor. The at least one processor may control the wireless communication circuit to communicate with a base station through at least one first cell using the first communication protocol in at least one frequency band, and may control the wireless communication circuit to receive, from the base station, configuration information on a second cell using the second communication protocol different from the first communication protocol. The at least one processor may determine, based on the configuration information on the second cell, whether a frequency band of the second cell is included in the at least one frequency band,
(Continued)

may determine whether a blocking condition is satisfied, and may control the wireless communication circuit to transmit a measurement result of the second cell to the base station or control the measurement result of the second cell not to be reported to the base station.

18 Claims, 23 Drawing Sheets

(51) Int. Cl.
*H04W 24/10* (2009.01)
*H04W 76/30* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 11,129,239 | B2 | 9/2021 | Liu et al. | |
| 2013/0058244 | A1 | 3/2013 | Huang | |
| 2019/0289538 | A1 | 9/2019 | Jang | |
| 2020/0100128 | A1 | 3/2020 | Fan et al. | |
| 2020/0236605 | A1 | 7/2020 | Yiu | |
| 2021/0051623 | A1* | 2/2021 | Manolakos | G01S 5/0236 |
| 2021/0058953 | A1 | 2/2021 | Bendlin et al. | |
| 2021/0068000 | A1 | 3/2021 | Tao et al. | |
| 2021/0144561 | A1* | 5/2021 | Chaturvedi | H04L 5/001 |
| 2022/0077993 | A1 | 3/2022 | Hong et al. | |
| 2023/0239705 | A1* | 7/2023 | Gronstad | H04W 16/10 370/329 |

FOREIGN PATENT DOCUMENTS

| | | | |
|---|---|---|---|
| EP | 3876586 | A1 | 9/2021 |
| JP | 2021029025 | A | 2/2021 |
| KR | 101741287 | B1 | 5/2017 |
| KR | 101888045 | B1 | 9/2018 |
| KR | 102207501 | B1 | 1/2021 |
| KR | 20210121091 | A | 10/2021 |
| KR | 20220121624 | A | 9/2022 |
| WO | WO 2014/089069 | A1 | 6/2014 |
| WO | 2017059889 | A1 | 4/2017 |

OTHER PUBLICATIONS

"3rd Generation Partnership Project; Technical Specification Group Radio Access Network; NR; Radio Resource Control (RRC) protocol specification (Release 16)", 3GPP TS 38.331 V16.6.0, Sep. 2021, 962 pages.

* cited by examiner

ELECTRONIC DEVICE AND METHOD FOR DYNAMIC SPECTRUM SHARING IN WIRELESS COMMUNICATION SYSTEM

CROSS-REFERENCE TO RELATED APPLICATIONS

This application is a continuation of International Application No. PCT/KR2022/015738 filed on Oct. 17, 2022, designating the United States, and claiming priority to Korean Patent Application No. 10-2021-0149962, filed Nov. 3, 2021 in the Korean Intellectual Property Office, the disclosures of all of which are hereby incorporated by reference herein in their entireties.

BACKGROUND

Field

Certain example embodiments relate to an electronic device and/or a method for dynamic spectrum sharing in a wireless communication system.

Description of Related Art

An electronic device (e.g., a user equipment (UE)) may perform wireless communication with a base station, and recently, electronic devices that perform not only 4th generation (4G) communication but also 5G communication have been commercialized.

With the introduction of the 5G communication system, networks and communication operators are required to build an infrastructure for the 5G communication system. As such, the introduction of a new radio access technology (RAT) may act as a burden on the operators. In order to relieve this burden and reduce path loss due to 5G communication, a dynamic spectrum sharing (DSS) environment, in which both 4G communication and 5G communication are capable of being performed in the same frequency band, may be provided. Furthermore, the electronic device may perform 5G communication with a 5G base station by reporting the result of DSS cell measurement to a 4G base station in the DSS environment.

SUMMARY

When an electronic device is in a dynamic spectrum sharing (DSS) environment, there is a problem in that a DSS cell measurement result is always reported without considering conditions (e.g., data throughput or the moving speed of the electronic device) related to the electronic device. In this case, the electronic device performs communication using 5G even in a situation where communication using 4G is more advantageous, and thus radio resources may be not efficiently used.

An example embodiment provides a method and a device for reporting a DSS cell measurement result in consideration of a condition of an electronic device when the electronic device is placed in a DSS environment.

According to an example embodiment, an electronic device may include at least one antenna, a wireless communication circuit connected, directly or indirectly, to the at least one antenna and configured to support a first communication protocol and a second communication protocol, and at least one processor connected, directly or indirectly, to the wireless communication circuit. The at least one processor may be configured to control the wireless communication circuit to communicate with a base station through at least one first cell using the first communication protocol in at least one frequency band, and control the wireless communication circuit to receive, from the base station, configuration information on a second cell using the second communication protocol different from the first communication protocol. The at least one processor may be configured to determine, based on the configuration information on the second cell, whether a frequency band of the second cell is included in the at least one frequency band, and determine whether a blocking condition is satisfied in case that the frequency band is included in the at least one frequency band. The at least one processor may be configured to control the wireless communication circuit to transmit a measurement result of the second cell to the base station in case that the blocking condition is not satisfied, and control the measurement result of the second cell not to be reported to the base station in case that the blocking condition is satisfied.

According to an example embodiment, an operation method performed by an electronic device may include controlling a wireless communication circuit to communicate with a base station in at least one first cell of at least one frequency band through a first communication protocol, receiving, from the base station, configuration information on a second cell related to a second communication protocol different from the first communication protocol, determining, based on the configuration information on the second cell, whether a frequency band of the second cell is included in the at least one frequency band, determining whether a blocking condition is satisfied in case that the frequency band is included in the at least one frequency band, controlling the wireless communication circuit to transmit a measurement result of the second cell to the base station in case that the blocking condition is not satisfied, and controlling the measurement result of the second cell not to be reported to the base station in case that the blocking condition is satisfied.

According to an example embodiment, when the electronic device is placed in a dynamic spectrum sharing (DSS) environment, the electronic device may selectively report a DSS cell measurement result in consideration of a designated criterion.

The electronic device may efficiently use radio resources by reporting the DSS cell measurement result in consideration of the designated criterion.

When the actual 5G throughput of the electronic device is different from the expected 5G throughput of the electronic device, the electronic device may more efficiently use radio resources by reporting an additional DSS cell measurement result.

In addition, various effects directly or indirectly identified through the disclosure may be provided.

BRIEF DESCRIPTION OF DRAWINGS

The above and other aspects, features and advantages of certain embodiments will be more apparent from the following detailed description, taken in conjunction with the accompanying drawings, in which.

DETAILED DESCRIPTION

Hereinafter, various example embodiments will be described with reference to the accompanying drawings. However, it should be understood that there is no intent to limit the disclosure to particular embodiments and that the disclosure covers various modifications, equivalents, or alternatives of embodiments thereof.

In addition, the disclosure describes various embodiments by using terms used in some communication standards (e.g., long-term evolution (LTE) and new radio (NR) defined in 3rd generation partnership project (3GPP)), but these are merely examples for description. Various example embodiments may be easily modified and applied to other communication systems.

Also, in the disclosure, the expression "more than" or "less than" is used to determine whether a specific condition is satisfied or fulfilled, but this is only a description to express an example and is not intended to exclude the expression "equal to or more than" or "equal to or less than". A condition described as "equal to or more than" may be replaced with "more than", a condition described as "equal to or less than" may be replaced with "less than", and a condition described as "equal to or more than and less than" be replaced with "more than and equal to or less than".

Terms used in the following description, such as terms related to multiple connectivity (e.g., dual connectivity (DC), multi-radio technology (RAT) (MR)-DC, cell group, master cell group (MCG), secondary cell group, and SCG), terms referring to signals (e.g., reference signal, system information, control signal, message, data), or terms referring to network entities (e.g., communication node, radio node, radio unit, network node, master node (MN), secondary node (SN), transmission/reception point (TRP), digital unit (DU), radio unit (RU), and massive MIMO unit (MMU), are provided examples for convenience of description. Accordingly, the disclosure is not limited to the terms described below, and other terms having equivalent technical meanings may be used.

In the disclosure, various indicators may be used as metrics for measuring channel quality of a signal of a cell. In order to indicate the channel quality, reference signal received power (RSRP), beam reference signal received power (BRSRP), reference signal received quality (RSRQ), received signal strength indicator (RSSI), signal to interference and noise ratio (SINR), carrier to interference and noise ratio (CINR), SNR, error vector magnitude (EVM), bit error rate (BER), block error rate (BLER), other terms having equivalent technical meanings, or other metrics indicating channel quality may be used.

Figure 1:
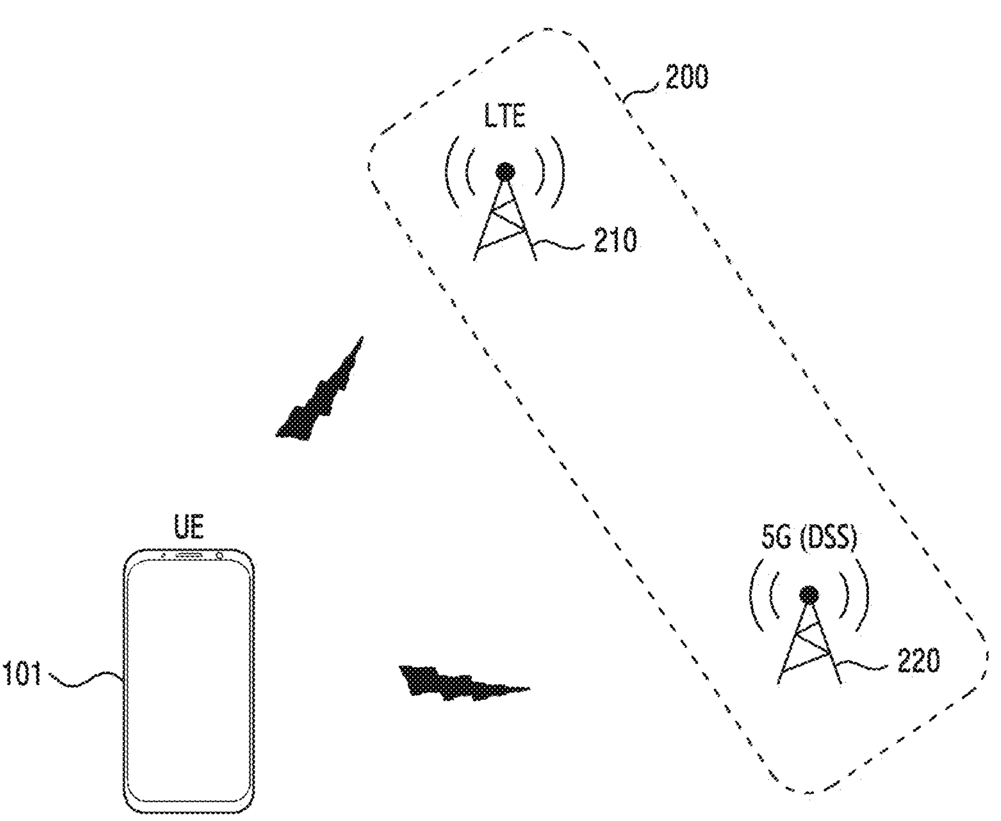
FIG. 1 illustrates an example of a network environment according to an example embodiment.

FIG. 1 illustrates an example of a network environment according to example embodiments. FIG. 1 illustrates a first base station 210, a second base station 220, and an electronic device 101 as some of nodes using a radio channel in a wireless communication system. The first base station 210 and the second base station 220 may communicate with the electronic device 101 while sharing the same spectrum band. Hereinafter, for convenience of description, a situation in which two base stations share a frequency band is described as an example, but it goes without saying that the embodiments described below may also be applied to three or more base stations.

Referring to FIG. 1, the first base station 210 and the second base station 220 are network infrastructures that provide wireless access to the electronic device 101. The first base station 210 and the second base station 220 have coverage for example as a predetermined geographical area based on a distance over which signals can be transmitted. Hereinafter, the term "coverage" used may refer to a service coverage area from a base station. Each base station may cover one cell or may cover multiple cells. Here, the multiple cells may be distinguished by a frequency supported thereby and an area of a sector covered thereby.

The first base station 210 may be referred to as "access point (AP)", "eNodeB (eNB)", "wireless point", "transmission/reception point (TRP)", "distributed unit, DU)", "radio unit (RU)", "remote radio head (RRH)", or other terms having equivalent technical meaning, in addition to a base station. According to various embodiments, the first base station 210 may be connected, directly or indirectly, to one or more "transmission/reception points (TRPs)". The first base station 210 may transmit a downlink signal to the electronic device 101 or receive an uplink signal from the electronic device 101 through the one or more TRPs. According to an embodiment, the first base station 210 may provide a first communication scheme (e.g., LTE) as is a radio access technology (RAT). In an example, the electronic device 101 may transmit and receive wireless signals to and from the first base station 210 in a frequency band of about 800 MHz to about 2.6 GHz.

The second base station 220 may be referred to as "5G node", "5G NodeB (NB)", "next generation node B (gNB)", "wireless point", "transmission/reception point (TRP)", "central unit (CU)", "distributed unit (DU)", "radio unit (RU)", "remote radio head (RRH), or other terms having equivalent technical meaning, in addition to the base station. According to various embodiments, the second base station 220 may be connected, directly or indirectly, to one or more "transmission/reception points (TRPs)". The second base station 220 may transmit a downlink signal to the electronic device 101 or receive an uplink signal from the electronic device 101 through the one or more TRPs. According to an embodiment, the second base station 220 may provide a second communication scheme (e.g., NR) as a radio access technology (RAT). In an example, the electronic device 101 may transmit and receive wireless signals in a frequency band of a first frequency range (e.g., FR1 of NR: 410 megahertz (MHz) to 7125 MHz)) or a second frequency range (e.g., FR2 of NR: 24250 MHz to 52600 MHz or 24250 MHz to 100000 MHz).

Although not illustrated in FIG. 1, in a 5G system, in order to support network function virtualization and more efficient resource management and scheduling, a base station may be implemented in distributed deployment. For example, in a 5G system, a base station (gNB) may be further divided into a central unit (CU) and a distributed unit (DU). The CU has at least radio resource control (RRC) and packet data convergence protocol (PDCP) protocol layers, and may include service data adaptation protocol (SDAP). The DU has radio link control (RLC), medium access control (MAC), physical layer, etc. There is a standardized public interface F1 between the CU and the DU. The F1 interface is divided into a control plane F1-C and a user plane F1-U. The transport network layer of the F1-C is based on IP transport. In order to more reliably transmit signaling, a stream control transmission protocol (SCTP) protocol is added on an internet protocol (IP). An application layer protocol is F1 AP. SCTP may provide reliable application layer messaging. The transport layer of F1-U is user datagram protocol (UDP)/IP. General packet radio service (GPRS) tunneling protocol (GTP)-U is used over UDP/IP to perform user plane protocol data unit PDUs.

The electronic device 101 is a device used by a user, and may perform communication with a base station 210 and/or 220 over a wireless channel. In some cases, the electronic devices 101 may be operated without user involvement. That is, at least one of the electronic devices 101 may be a device that performs machine type communication (MTC) and may not be carried by a user. The electronic device 101 may be referred to as "user equipment (UE)", "mobile station", "subscriber station", "customer premises equipment (CPE)", "remote terminal", "wireless terminal", "electronic device", "vehicle terminal", "user device", or other terms having an equivalent technical meaning, in addition to terminal.

Although not illustrated in FIG. 1, the first base station 210 or the second base station 220 may be connected, directly or indirectly, to an evolved packet core (EPC) network or a 5th generation core (5GC) network, which is the core of a 4G network.

According to an embodiment, the electronic device 101 may be placed in a dynamic spectrum sharing (DSS) environment where both 4G communications and 5G communications can be performed in the same frequency band. In an example, the electronic device 101 may perform wireless communication with the first base station 210 in a first frequency band, and may perform wireless communication with either the first base station 210 or the second base station 220 in a second frequency band. For example, the electronic device 101 may perform wireless communication with the first base station 210 in the B20 band (800 MHz), and may perform wireless communication with either the first base station 210 or the second base station 220 in the B3 band (1.8 GHz). In another example, the electronic device 101 may perform wireless communication with the first base station 210 in the B66 band (1.7 GHz), and may perform wireless communication with either the first base station 210 or the second base station 220 in the B5 band (850 MHz).

According to an embodiment, the first base station 210 and the second base station 220 may be implemented as a single base station. For example, the single base station may provide both 4G communication and 5G communication. In FIG. 1, at least one base station 200 is illustrated as including the first base station 210 and the second base station 220, but the first base station 210 and the second base station 220 may be integrated into any one base station.

Figure 2:
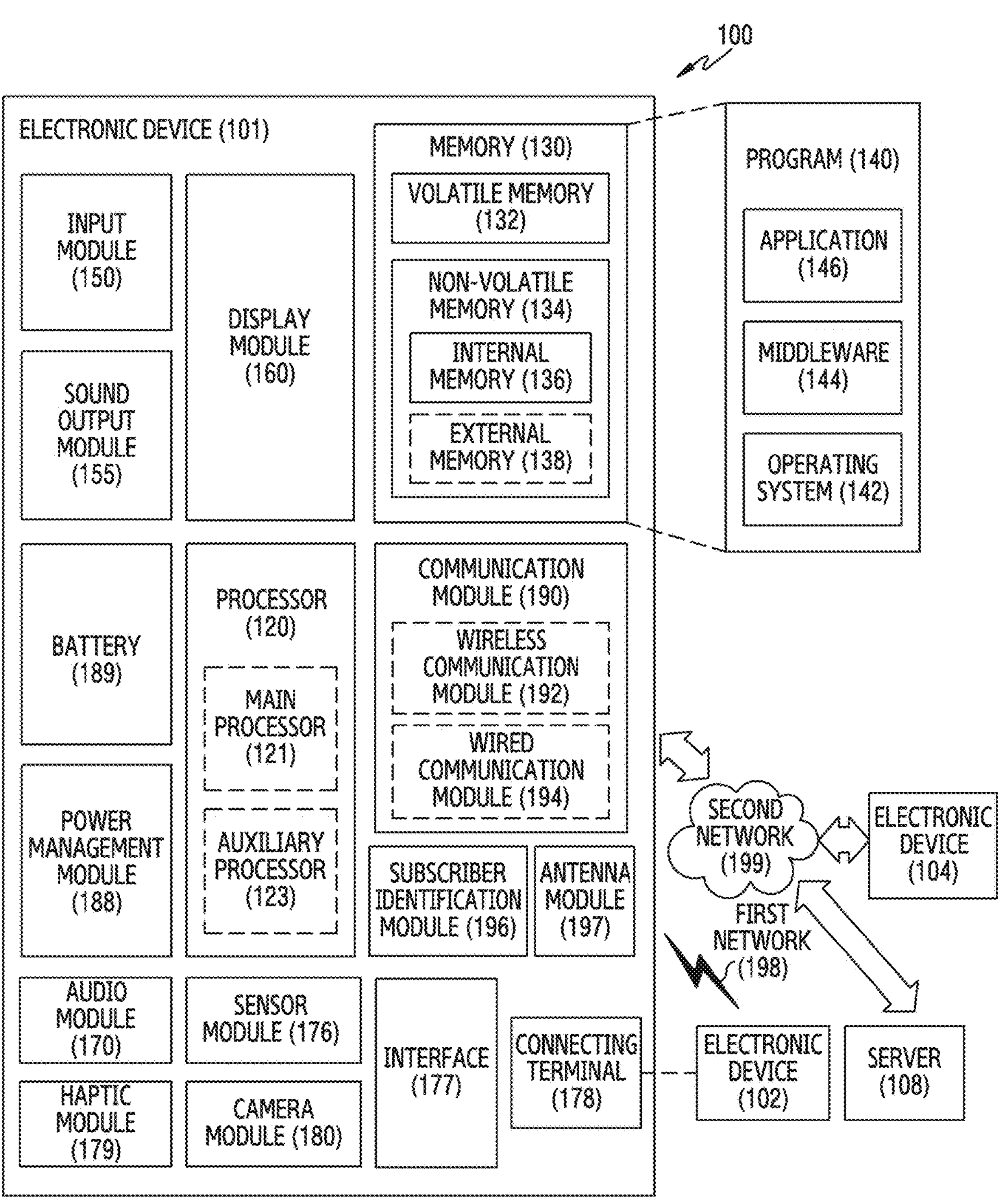
FIG. 2 is a block diagram of an electronic device in a network environment according to an example embodiment.

FIG. 2 is a block diagram illustrating an electronic device 101 in a network environment 100 according to various embodiments.

Referring to FIG. 2, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160 comprising a display, an audio module 170, a sensor module 176 comprising a sensor, an interface 177, a connecting terminal 178, a haptic module 179, a camera module 180, a power management module 188 comprising circuitry, a battery 189, a communication module 190 comprising communication circuitry, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled, directly or indirectly, with the processor 120, and may perform various data processing or computation. According to an embodiment, as at least part of the data processing or computation, the processor 120 may store a command or data received from another component (e.g., the sensor module 176 or the communication module 190 comprising communication circuitry) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled, directly or indirectly, with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 comprising communication circuitry (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted and/or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands and/or data may be transmitted and/or received between the electronic device 101 and the external electronic device 104 via the server 108 coupled, directly or indirectly, with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 3:
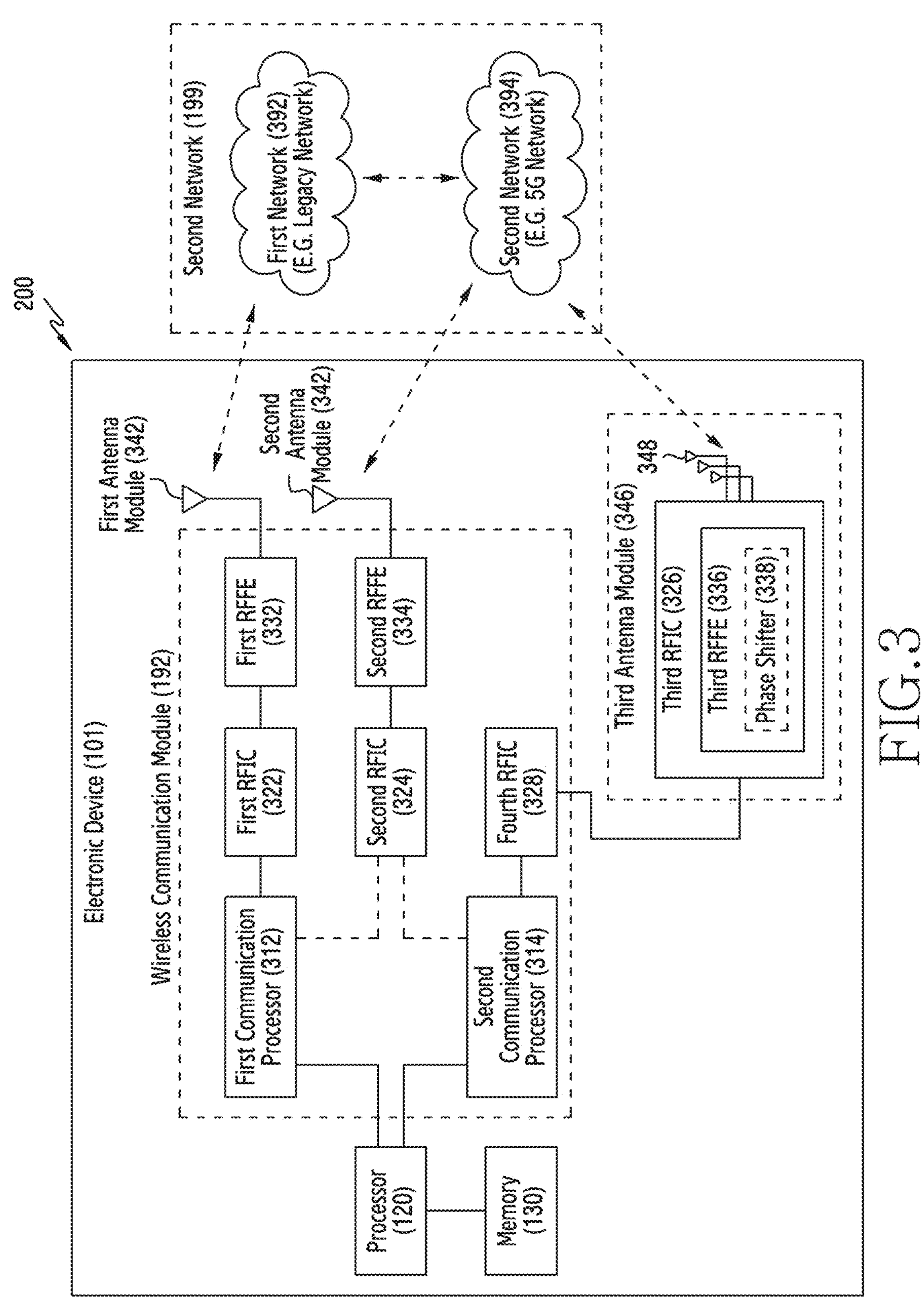
FIG. 3 is a block diagram of an electronic device for supporting legacy network communication and 5th generation (5G) network communication according to an example embodiment.

FIG. 3 is a block diagram of the electronic device 101 for supporting legacy network communication and 5th generation (5G) network communication according to various embodiments.

Referring to FIG. 3, the electronic device 101 may include a first communication processor 312, a second communication processor 314, a first RFIC 322, a second RFIC 324, a third RFIC 326, a fourth RFIC 328, a first radio frequency front end (RFFE) 332, a second RFFE 334, a first antenna module 342, a second antenna module 344, and an antenna 348. The electronic device 101 may further include a processor 120 and a memory 130. A second network 199 may include a first type network 392 and a second type network 394. According to another embodiment, the electronic device 101 may further include at least one among the components illustrated in FIG. 1, and the second network 199 may further include at least one other network. According to an embodiment, the first communication processor 312, the second communication processor 314, the first RFIC 322, the second RFIC 324, the fourth RFIC 328, the first RFFE 332, and the second RFFE 334 may form at least a part of a wireless communication module 192. According to another embodiment, the fourth RFIC 328 may be omitted or may be included as a part of the third RFIC 326.

The first communication processor 312 may establish a communication channel for a band to be used for wireless communication with the first type network 392, and may support legacy network communication through the established communication channel According to various embodiments, the first type network 392 may be a legacy network including a 2G, 3G, 4G, or long-term-evolution (LTE) network. The second communication processor 314 may establish a communication channel corresponding to a designated band (e.g., from about 410 MHz to about 100 GHz) among bands to be used for wireless communication with the second type network 394, and may support 5G network communication through the established communication channel. According to various embodiments, the second type network 394 may be a 5G network defined in the 3GPP. Additionally, according to an embodiment, the first communication processor 312 or the second communication processor 314 may establish a communication channel corresponding to another designated band (e.g., about 7.125 GHz or less) among bands to be used for wireless communication with the second type network 394, and may support 5G network communication through the established communication channel. According to an embodiment, the first communication processor 312 and the second communication processor 314 may be implemented in a single chip or a single package. According to various embodiments, the first communication processor 312 or the second communication processor 314 may be disposed in a single chip or a single package together with the processor 120, an auxiliary processor 123, or a communication module 190.

At the time of signal transmission, the first RFIC 322 may convert a baseband signal generated by the first communication processor 312 into a RF signal of about 700 MHz to about 3 GHz used for the first type network 392 (e.g., a legacy network). At the time of signal reception, an RF signal may be acquired from the first type network 392 (e.g., the legacy network) through an antenna (e.g., the first antenna module 342), and may be preprocessed through an RFFE (e.g., the first RFFE 332). The first RFIC 322 may convert the preprocessed RF signal into a baseband signal that can be processed by the first communication processor 312.

At the time of signal transmission, the second RFIC 324 may convert a baseband signal generated by the first communication processor 312 or the second communication processor 314 into an RF signal (hereinafter, referred to as a “5G Sub6 RF signal” or “frequency range 1 (FR1) signal”) of a Sub6 band (e.g., about 7.125 GHz or less) used for the second type network 394 (e.g., a 5G network). At the time of signal reception, a 5G Sub6 RF signal may be acquired from the second type network 394 (e.g., the 5G network) through an antenna (e.g., the second antenna module 344), and may be preprocessed through an RFFE (e.g., the second RFFE 334). The second RFIC 324 may convert the preprocessed 5G Sub6 RF signal into a baseband signal that can be processed by a corresponding communication processor among the first communication processor 312 or the second communication processor 314.

The third RFIC 326 may convert a baseband signal generated by the second communication processor 314 into an RF signal (hereinafter, referred to as a “5G Above6 RF signal” or “FR2 signal”) of a 5G Above6 band (e.g., from about 24.25 GHz to 52.6 GHz) to be used in the second type network 394 (e.g., the 5G network). At the time of signal reception, a 5G Above6 RF signal may be acquired from the second type network 394 (e.g., the 5G network) through an antenna (e.g., the antenna 348), and may be preprocessed through a third RFFE 336. The third RFIC 326 may convert the preprocessed 5G Above6 RF signal into a baseband signal that can be processed by the second communication processor 314. According to an embodiment, the third RFFE 336 may be formed as a part of the third RFIC 326.

According to an embodiment, the electronic device 101 may include the fourth RFIC 328 separately from the third RFIC 326 or as at least a part thereof. The fourth RFIC 328 may convert a baseband signal generated by the second communication processor 314 into an RF signal of an intermediate frequency band (e.g., from about 9 GHz to about 11 GHz) (hereinafter, referred to as an “IF signal”), and may then transmit the IF signal to the third RFIC 326. The third RFIC 326 may convert the IF signal into a 5G Above6 RF signal. At the time of signal reception, a 5G Above6 RF signal may be received from the second type network 394 (e.g., the 5G network) through an antenna (e.g., the antenna 348), and may be converted into an IF signal by the third RFIC 326. The fourth RFIC 328 may convert the IF signal into a baseband signal that can be processed by the second communication processor 314.

According to an embodiment, the first RFIC 322 and the second RFIC 324 may be implemented as at least a part of a single package or a single chip. According to an embodiment, the first RFFB 332 and the second RFFE 334 may be implemented as at least a part of a single package or a single chip. According to an embodiment, at least one antenna module of the first antenna module 342 or the second antenna module 344 may be omitted, or may be combined with the other antenna module to process RF signals of multiple corresponding bands.

According to an embodiment, the third RFIC 326 and the antenna 348 may be arranged on the same substrate to form a third antenna module 346. For example, the wireless communication module 192 or the processor 120 may be disposed on a first substrate (e.g., a main PCB). In this case, the third antenna module 346 may be formed by disposing the third RFIC 326 in a partial area (e.g., a lower surface) of a second substrate (e.g., a sub-PCB) different from the first substrate and disposing the antenna 348 in another partial area (e.g., an upper surface) of the second substrate. Disposing the third RFIC 326 and the antenna 348 on the same substrate may reduce the length of a transmission line therebetween. This may reduce, for example, the loss (e.g., attenuation) of a signal in a high-frequency band used for 5G network communication due to the transmission line. Therefore, the electronic device 101 may improve the quality or speed of communication with the second type network 394 (e.g., the 5G network).

According to an embodiment, the antenna 348 may be formed as an antenna array including multiple antenna elements usable for beamforming. In this instance, for example, the third RFIC 326 may include, as a part of the third RFFE 336, multiple phase shifters 338 corresponding to the multiple antenna elements. At the time of signal transmission, each of the multiple phase shifters 338 may shift the phase of a 5G Above6 RF signal to be transmitted from the electronic device 101 to the outside (e.g., a base station of a 5G network) through a corresponding antenna element. At the time of signal reception, each of the multiple phase shifters 338 may shift the phase of a 5G Above6 RF signal received from the outside through a corresponding antenna element into an identical or substantially identical phase. This enables transmission or reception through beamforming between the electronic device 101 and the outside.

The second type network 394 (e.g., the 5G network) may be operated independently of the first type network 392 (e.g., the legacy network) (e.g., standalone (SA)) or may be operated while being connected, directly or indirectly, to the first type network (e.g., non-standalone (NSA)). For example, the 5G network may include only an access network (e.g., a 5G radio access network (RAN) or next-generation (NG) RAN, and may not include a core network (e.g., a next-generation core (NGC)). In this case, the electronic device 101 may access the access network of the 5G network and may then access an external network (e.g., the Internet) under the control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in a memory 130, and may be accessed by another component (e.g., the processor 120, the first communication processor 312, or the second communication processor 314).

Figure 4:
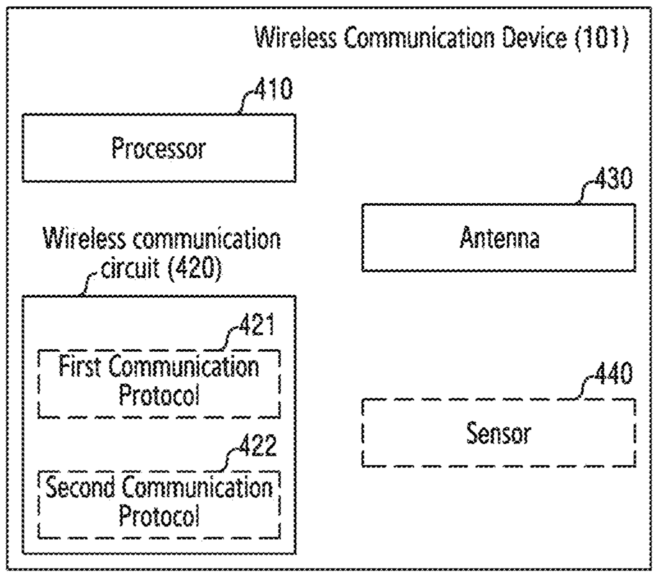
FIG. 4 illustrates hardware elements of an electronic device according to an example embodiment.

FIG. 4 illustrates hardware elements of an electronic device according to an embodiment.

Referring to FIG. 4, the electronic device (or, wireless communication device) 101 may include at least one processor 410, a wireless communication circuit 420, and at least one antenna 430. In an example, the at least one processor 410 may be electrically connected, directly or indirectly, to the wireless communication circuit 420 and the at least one antenna 430.

According to an embodiment, the at least one processor 410 may be understood as an element that is identical to the processor 120 illustrated in FIG. 2 or 3. In an example, the at least one processor 410 may control at least one other element (e.g., hardware element) of the electronic device 101 connected, directly or indirectly, to the at least one processor 410 and may perform various types of data processing or calculations. For example, the at least one processor 410 may include an application processor (AP) and/or a communication processor (CP).

According to an embodiment, the wireless communication circuit 420 may perform wireless communication with at least one base station 200 by using a first communication protocol 421 or a second communication protocol 422. In an example, the first communication protocol 421 may include an LTE communication protocol and/or a 4G communication protocol defined by 3GPP, and the second communication protocol 422 may include a 5G communication protocol defined by 3GPP. However, the disclosure is not limited thereto, and in various embodiments, the first communication protocol 421 and the second communication protocol 422 may be understood as heterogeneous communication protocols to which operations described herein may be applied.

According to an embodiment, the wireless communication circuit 420 may be disposed on a printed circuit board. In an example, the wireless communication circuit 420 may transmit an RF signal to an electronic component electrically connected, directly or indirectly, to the printed circuit board or may receive an RF signal from the electronic component.

According to an embodiment, the at least one processor 410 and the wireless communication circuit 420 may be integrally formed in a single chip or a single package. In an example, the at least one processor 410 and the wireless communication circuit 420 may be formed of a single communication processor (e.g., the first communication processor 312 or the second communication processor 314 illustrated in FIG. 3). For example, the at least one processor 410 and the wireless communication circuit 420 may be formed in one chip or one package to perform 4G communication or 5G communication with the at least one base station 200.

According to an embodiment, the at least one antenna 430 may be understood as an element included in the antenna module 197 illustrated in FIGS. 1-2. In an example, the at least one antenna 430 may use the first communication protocol 421 or the second communication protocol 422 to transmit a signal or power to an external device or receive a signal or power from the external device. For example, the at least one antenna 430 may transmit or receive a 4G or 5G radio signal by using antenna diversity or an antenna array.

According to an embodiment, the electronic device 101 may further include at least one sensor 440. In an example, the at least one sensor 440 may be understood as an element included in the sensor module 176 illustrated in FIGS. 1-2. The at least one sensor 440 may include a sensor capable of measuring the movement speed of the electronic device 101, for example, an acceleration sensor and/or a GPS sensor. In an embodiment, the electronic device 101 may measure the moving speed or acceleration of the electronic device 101 by using the at least one sensor 440 to generate a corresponding data value.

Figure 5A:
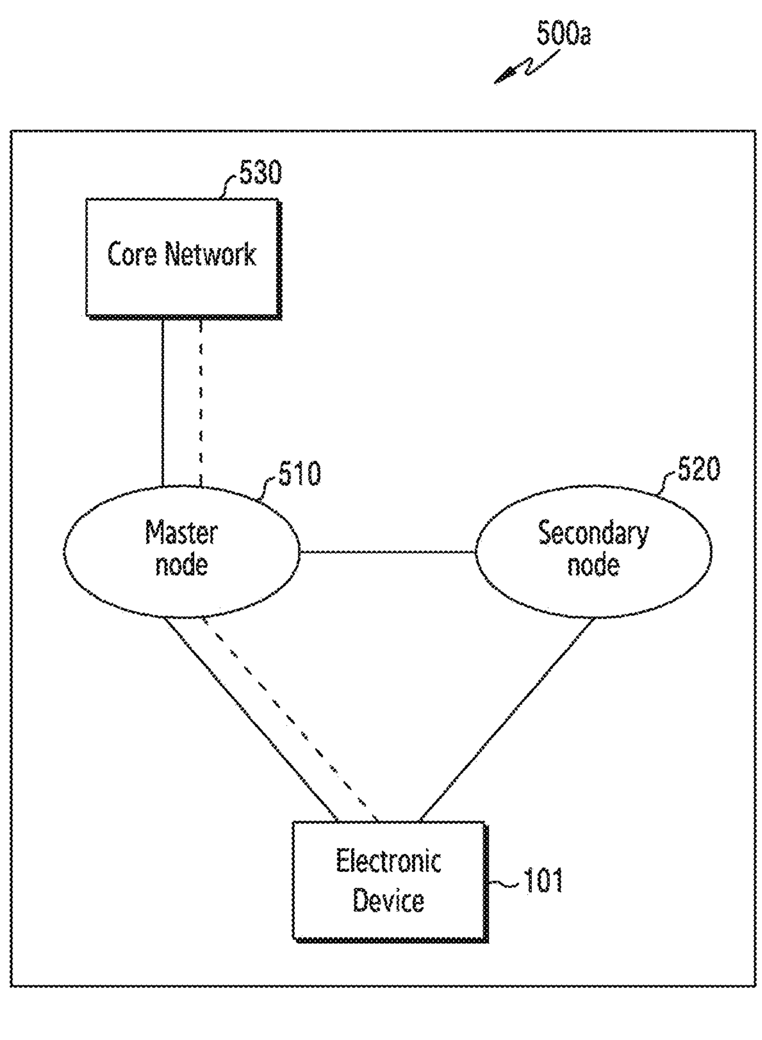
FIG. 5A illustrates a wireless communication system providing a network of legacy communication and/or 5G communication according to an example embodiment.

FIG. 5A illustrates a wireless communication system providing a network of legacy communication and/or 5G communication according to an example embodiment.

Figure 5B:
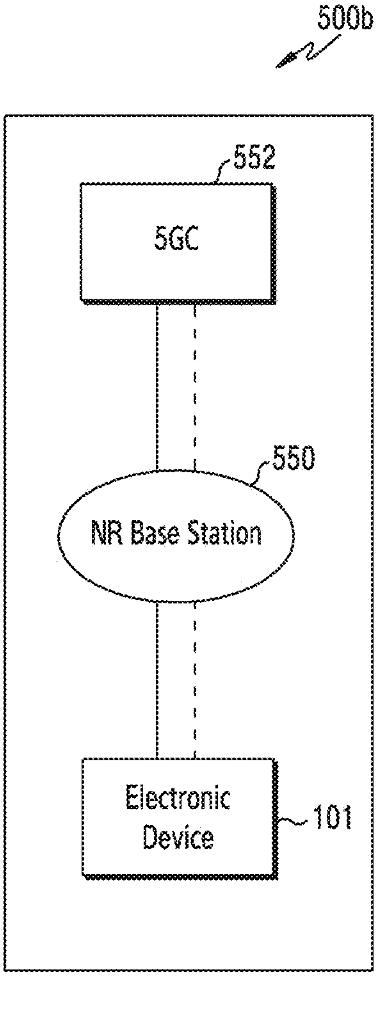
FIG. 5B illustrates a wireless communication system providing a network of legacy communication and/or 5G communication according to an example embodiment.

FIG. 5B illustrates a wireless communication system providing a network of legacy communication and/or 5G communication according to an example embodiment.

Figure 5C:
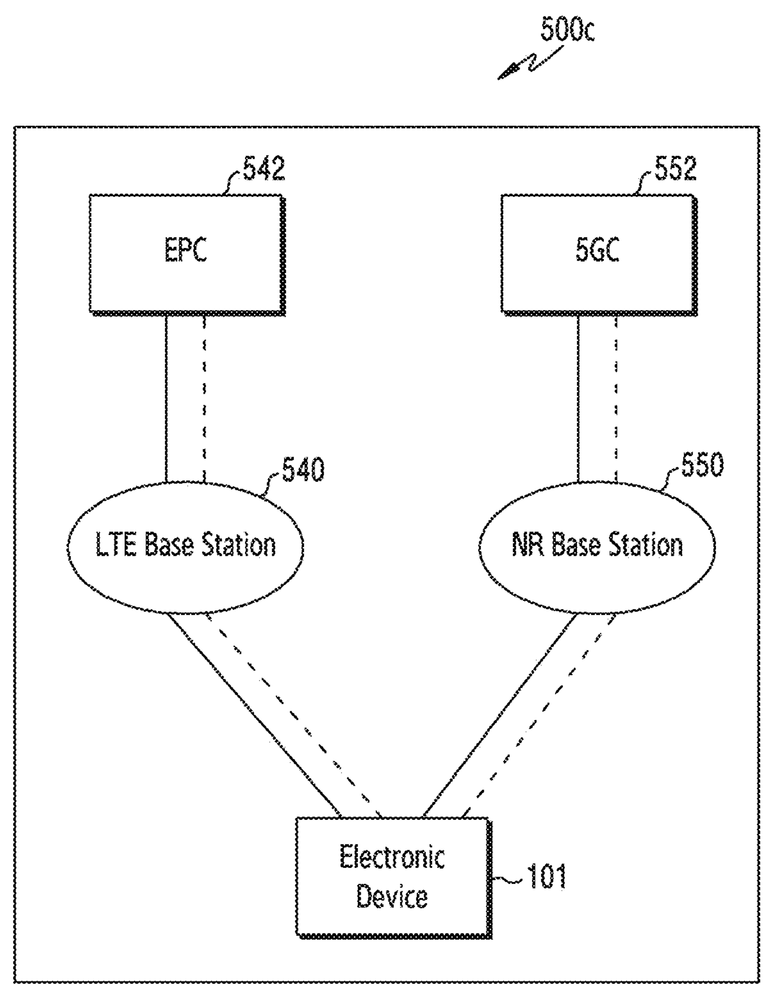
FIG. 5C illustrates a wireless communication system providing a network of legacy communication and/or 5G communication according to an example embodiment.

FIG. 5C illustrates a wireless communication system providing a network of legacy communication and/or 5G communication according to an example embodiment.

Referring to FIGS. 5A, 5B, and 5C, network environments 500*a* to 500*c* may include at least one of a legacy network and a 5G network. The legacy network may include, for example, a 4G or LTE base station 540 (e.g., eNodeB (eNB)) of the 3GPP standard, supporting wireless connection with the electronic device 101, and an evolved packet core (EPC) 542 for managing 4G communication. The 5G network may include, for example, a new radio (NR) base station 550 (e.g., gNodeB (gNB)), supporting wireless connection with the electronic device 101, and a 5th generation core (5GC) 552 for managing 5G communication of the electronic device 101. According to example embodiments, the electronic device 101 may transmit or receive a control message and user data through legacy communication and/or 5G communication. The control message may include, for example, a message related to at least one of security control, bearer setup, authentication, registration, or mobility management of the electronic device 101. The user data may refer to user data other than control messages transmitted and received between the electronic device 101 and a core network 530 (e.g., the EPC 542).

Referring to FIG. 5A, the electronic device 101 according to an embodiment may transmit or receive at least one of a control message or user data to or from at least a part (e.g., the NR base station 550 or the 5GC 552) of a 5G network by using at least a part (e.g., the LTE base station 540 or the EPC 542) of a legacy network.

According to an embodiment, the network environment 500*a* may include a network environment which provides dual connectivity (DC) to the LTE base station 540 and the NR base station 550 and in which a control message is transmitted to or received from the electronic device 101 through a core network 530 of either the EPC 542 or the 5GC 552.

According to an embodiment, in the DC environment, one of the LTE base station 540 or the NR base station 550 operates as a master node (MN) 510, and the other operates as a secondary node (SN) 520. The MN 510 may be connected, directly or indirectly, to the core network 530 to transmit and/or receive a control message. The MN 510 and the SN 520 may be connected, directly or indirectly, to each other through a network interface to transmit or receive a message related to radio resource (e.g., a communication channel) management.

According to an embodiment, the MN 510 may be configured as the LTE base station 540, the SN 520 may be configured as the NR base station 550, and the core network 530 may be configured as the EPC 542. For example, a control message may be transmitted and/or received through the LTE base station 540 and the EPC 542, and user data may be transmitted and/or received through at least one of the LTE base station 540 or the NR base station 550.

According to an embodiment, the MN 510 may be configured as the NR base station 550, the SN 520 may be configured as the LTE base station 540, and the core network 530 may be configured as the 5GC 552. For example, a control message may be transmitted and/or received through the NR base station 550 and the 5GC 552, and user data may be transmitted and/or received through at least one of the LTE base station 540 or the NR base station 550.

Referring to FIG. 5B, according to an embodiment, a 5G network may include the NR base station 550 and the 5GC 552, and may independently transmit or receive control messages and user data to or from the electronic device 101.

Referring to FIG. 5C, each of a legacy network and a 5G network according to an embodiment may independently provide data transmission and reception. For example, the electronic device 101 and the EPC 542 may transmit or receive control messages and user data through the LTE base station 540. In another example, the electronic device 101 and the 5GC 552 may transmit or receive control messages and user data through the NR base station 550. According to an embodiment, the electronic device 101 may be registered with at least one of the EPC 542 and the 5GC 552 to transmit and receive a control message. According to an embodiment, the EPC 542 and the 5GC 552 may interwork to manage communication of the electronic device 101. For example, movement information of the electronic device 101 may be transmitted and/or received through an interface (not shown, e.g., N26 interface) between the EPC 542 and the 5GC 552.

As described with reference to FIG. 5A or 5C, the LTE base station 540 and the NR base station 550 may support various arrangement scenarios. According to an embodiment, when both the LTE base station 540 and the NR base station 550 are connected to EPC, when the LTE base station 540 provides a primary cell group, and when the NR base station 550 provides a secondary cell group, a connection between the two base stations may be referred to as evolved universal terrestrial radio access-new radio dual-connectivity (EN-DC).

According to an embodiment, when both the LTE base station 540 and the NR base station 550 are connected, directly or indirectly, to EPC, when the LTE base station 540 provides a secondary cell group, and when the NR base station 550 provides a primary cell group, a connection between the two base stations may be referred to as NG-RAN evolved universal terrestrial radio access-new radio dual-connectivity (NGEN-DC).

According to an embodiment, when both the LTE base station 540 and the NR base station 550 are connected to 5GC, when the LTE base station 540 provides a primary cell group, and when the NR base station 550 provides a secondary cell group, a connection between the two base stations may be referred to as NG-RAN evolved universal terrestrial radio access-new radio dual-connectivity (NGEN-DC). According to an embodiment, when both the LTE base station 540 and the NR base station 550 are connected, directly or indirectly, to 5GC, when the LTE base station 540 provides a secondary cell group, and when the NR base station 550 provides a primary cell group, a connection between the two base stations may be referred to as new radio-evolved universal terrestrial radio access dual-connectivity (NE-DC). New radio dual-connectivity (NR-DC) connected between a 5G cell group and a 5G cell groups, and the above-described connections may be referred to as multi radio dual-connectivity (MR-DC).

Dynamic spectrum sharing (DSS) may refer to a technology that enables different wireless communication technologies (e.g., an LTE communication scheme and an NR communication scheme) to be used in the same frequency band. For example, according to DSS, by dynamically allocating the same frequency resource to LTE communication network data or NR communication network data, each electronic device supporting LTE and NR may share the resource on the same frequency and may receive service.

Various embodiments described below are not limited to a specific communication scheme (e.g., NR communication scheme or LTE communication scheme), and may be applied to any communication technology employing DSS in which data corresponding to a first communication network and data corresponding to a second communication network share the same frequency band. For example, the various embodiments may be identically or similarly applied to DSS based on an LTE communication scheme and a 3G communication, or DSS based on a 6G communication scheme and a 5G NR communication scheme, in addition to DSS based on the NR communication scheme and the LTE communication scheme.

Figure 6A:
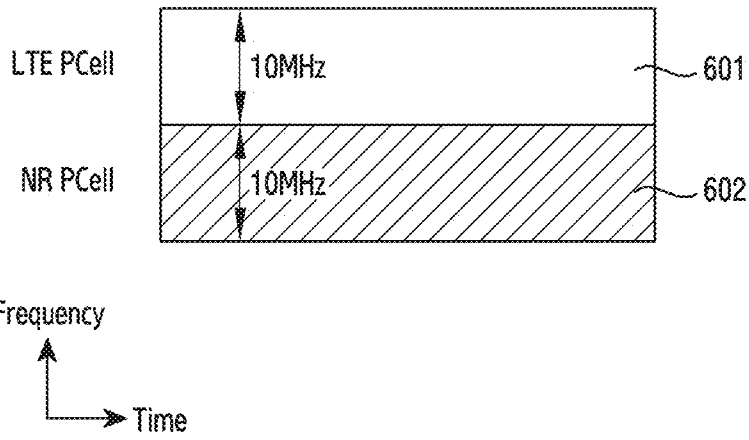
FIG. 6A illustrates a concept of dynamic spectrum sharing (DSS) according to an example embodiment.

FIG. 6A illustrates a concept of dynamic spectrum sharing (DSS) according to an example embodiment.

Figure 6B:
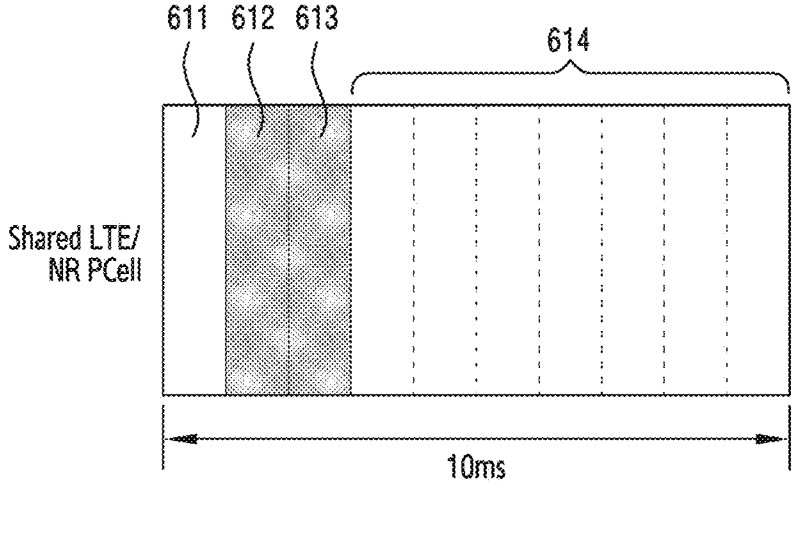
FIG. 6B illustrates a concept of dynamic spectrum sharing (DSS) according to an example embodiment.

FIG. 6B illustrates a concept of dynamic spectrum sharing (DSS) according to an example embodiment.

Figure 6C:
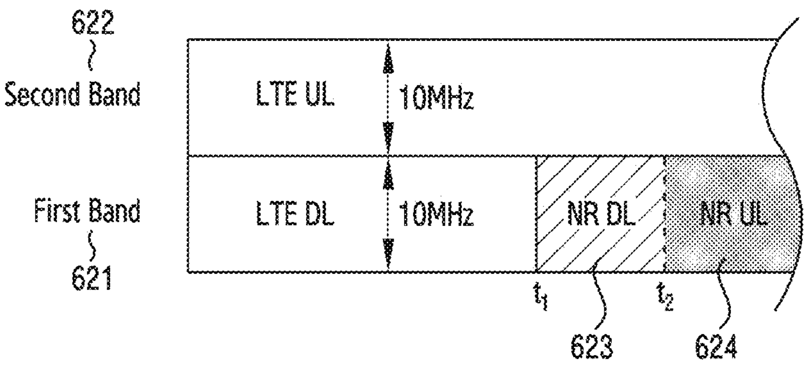
FIG. 6C illustrates a concept of dynamic spectrum sharing (DSS) according to an example embodiment.
Figure 6C:
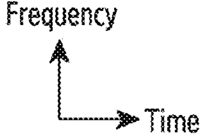

FIG. 6C illustrates a concept of dynamic spectrum sharing (DSS) according to an example embodiment.

Figure 6D:
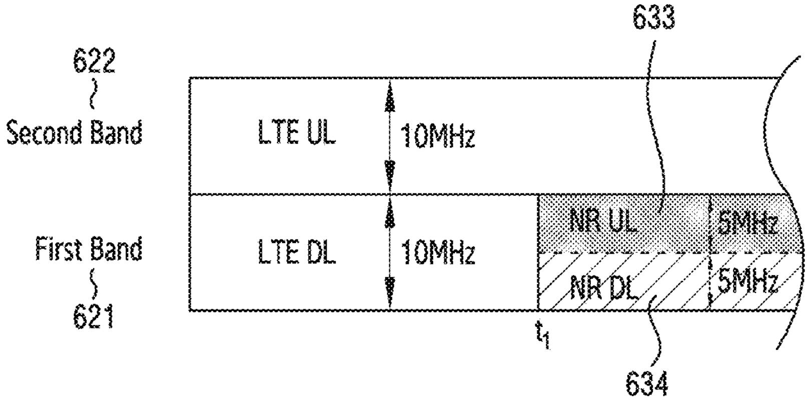
FIG. 6D illustrates a concept of dynamic spectrum sharing (DSS) according to an example embodiment.
Figure 6D:
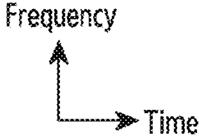

FIG. 6D illustrates a concept of dynamic spectrum sharing (DSS) according to an example embodiment.

Figure 6E:
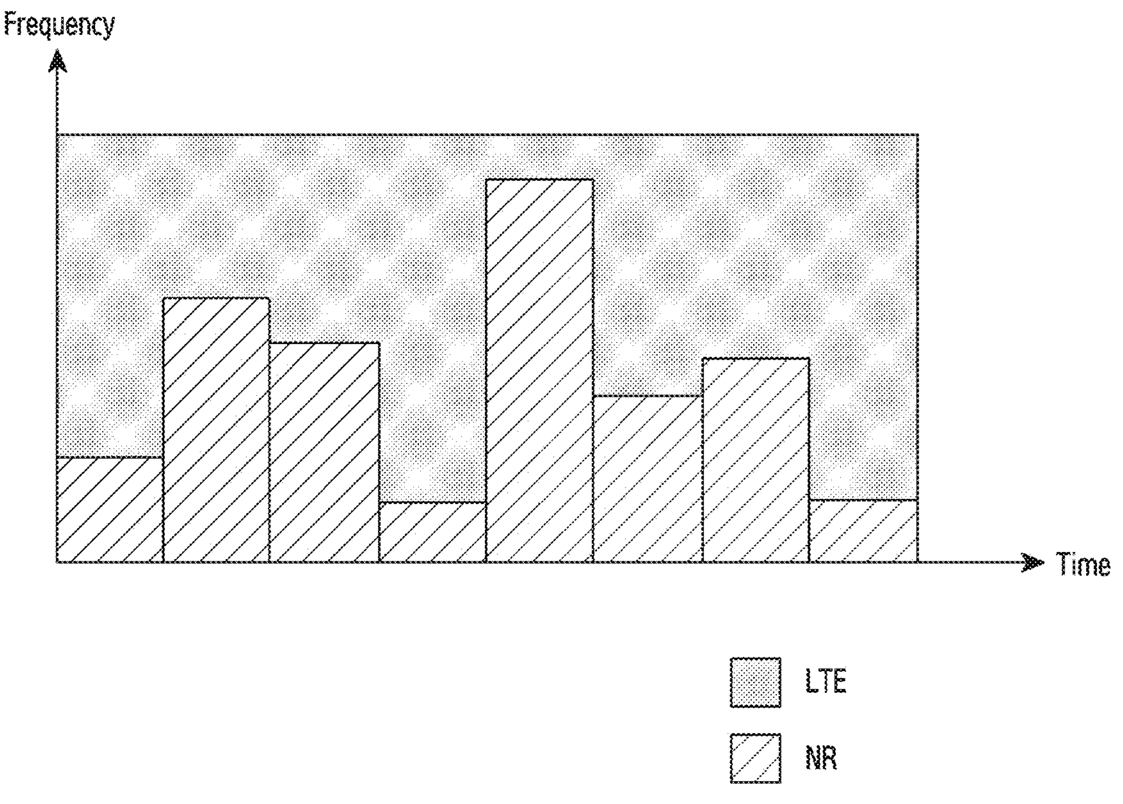
FIG. 6E illustrates a concept of dynamic spectrum sharing (DSS) according to an example embodiment.

FIG. 6E illustrates a concept of dynamic spectrum sharing (DSS) according to an example embodiment.

FIG. 6A illustrates a DSS concept of a frequency division multiplexing (FDM) scheme according to example embodiments, and FIG. 6B illustrates a DSS concept of a time division multiplexing (TDM) scheme according to example embodiments.

Referring to FIG. 6A, by applying DSS to a frequency band operated for a second communication network (e.g., an LTE communication network), at least a partial frequency domain 602 may be used for a first communication network (e.g., an NR communication network), and a remaining frequency domain 601 may be used for the second communication network (e.g., the LTE communication network). For example, if a frequency bandwidth operated for the second communication network is 20 MHz, 10 MHz may be used for transmission and reception of data corresponding to the first communication network, and the remaining 10 MHz may be used for transmission or reception of data corresponding to the second communication network. When DSS is applied to the frequency band, an electronic device (e.g., the electronic device 101 in FIG. 1) operating in NR may access an NR base station (an NR PCell) and transmit or receive data through the frequency domain 602 used for transmission and reception of data corresponding to an NR communication network, and an electronic device operating in LTE may access an LTE base station (an LTE PCell) and transmit or receive data through the frequency domain 601 used for transmission or reception of data corresponding to an LTE communication network.

According to an embodiment, in applying DSS, the size of a frequency domain allocated for the NR communication network in 20 MHz, which is the entire frequency bandwidth operated for the LTE communication network, may be dynamically adjusted according to time (e.g., in units of subframes). For example, in the entire frequency bandwidth of 20 MHz, the size of the frequency domain used for the NR communication network may be allocated as much as 10 MHz at a first time point and 8 MHz at a second time point. According to another embodiment, at the first point in time, the entire frequency bandwidth of 20 MHz may be used for the LTE communication network, and at the second point in time, a frequency domain of 10 MHz in the entire frequency bandwidth of 20 MHz may be used for the NR communication network.

Referring to FIG. 6B, by applying DSS to a radio frame operated for a second communication network (e.g., an LTE communication network), at least some subframes 612 and 613 may be used for a first communication network (e.g., an NR communication network), and the other subframes 611 and 614 may be used for the second communication network (e.g., the LTE communication network).

For example, assuming that the time of one radio frame is 10 ms and that one radio frame includes 10 subframes, the time of one subframe may be 1 ms. Referring to FIG. 6B, assuming that one radio frame includes subframes #0 to #9 from left to right, LTE communication network data may be transmitted and received in subframe #0 611, NR communication network data may be transmitted and received in subframe #1 612 and subframe #2 613, and LTE communication network data may be transmitted and received in the remaining subframes #3 to #9 614. According to an embodiment, as illustrated in FIG. 6B, when operating the DSS of the time division multiplexing scheme, an electronic device or a base station may transmit NR communication network data by using a multimedia broadcast multicast service single frequency network (MBSFN) subframe configured for an MBSFN service.

A SSB may be used for synchronization in 5G NR. LTE may configure multimedia broadcast single frequency network (MBSFN) subframes to periodically transmit the SSB of 5G NR. Six of the 10 subframes that constitute an LTE radio frame may be configured by a network to be MBSFN subframes. According to an embodiment, among the 10 subframes #0 to #9, subframes #1 (e.g., second), #2, #3, #6, #7, and #8 may be configured as MBSFN subframes. For example, when subframe #1 612 and subframe #2 613 are configured as MBSFN subframes, an electronic device or a base station may transmit broadcast service data or not transmit any data through the subframe #1 612 and subframe #2 613 configured as the MB SFN subframes in a base station (e.g., eNB) corresponding to the LTE communication network. According to an embodiment, a base station (e.g., eNB) corresponding to an LTE communication network may transmit LTE communication network data by using subframes 611 and 614 other than subframe #1 612 and subframe #2 613 configured as MBSFN subframe.

According to an embodiment, when the base station (e.g., eNB) corresponding to the LTE communication network does not transmit broadcast service data or does not transmit any data through subframe #1 612 and subframe #2 613 configured as the MBSFN subframes, subframe #1 612 and subframe #2 613 may be used as subframes for transmitting NR communication network data, and thus DSS of a time division multiplexing scheme may be applied. According to an embodiment, a base station (e.g., gNB) corresponding to the NR communication network may transmit NR communication network data through subframe #1 612 and subframe #2 613 which are configured as the MBSFN subframes and are not used by the base station (eNB) of the LTE communication network. According to an embodiment, the base station (e.g., gNB) corresponding to the NR communication network may transmit NR communication network data in at least one subframe, in which LTE communication network data has not been transmitted, among subframes #0 611 and subframes #3 to #9 614 that have not been configured as the MBSFN subframes and have been allocated for use by the base station (eNB) of the LTE communication network.

According to an embodiment, referring to FIGS. 6C and 6D, DSS may be applied to any one band (e.g., a first band 621 for downlink transmission or a second band 622 for uplink transmission) among frequency bands (e.g., the first band 621 for downlink transmission and the second band 622 for uplink transmission) operated for a second communication network (e.g., an LTE communication network). For example, the first band 621 allocated as a downlink band of the second communication network may be used as a downlink band (LTE DL) of the second communication network until a time point t1, and after the time point t1, all or at least a part of the first band 621 may be used for data transmission of a first communication network (e.g., an NR communication network). For example, the second band 622 allocated as an uplink band of the second communication network (e.g., the LTE communication network) may be used as the uplink band (LTE UL) of the second communication network (e.g., the LTE communication network) until a time point t1, and after the time point t1, all or at least a part of the second band 622 may be used for data transmission of the first communication network (e.g., the NR communication network).

According to an embodiment, the first band 621 allocated to the downlink band of the second communication network (e.g., the LTE communication network) may be used as a downlink band (LTE DL) of the second communication network (e.g., the LTE communication network) until a time point t1, and after the time point t1, all or at least a part of the first band 621 may be used for data transmission of the first communication network (e.g., NR DL). The second band 622 allocated as an uplink band of the second communication network (e.g., the LTE communication network) may be used as an uplink band (LTE UL) of the second communication network (e.g., the LTE communication network) until a time point t1, and after the time point t1, all or at least a part of the second band 622 may be used for data transmission of the first communication network (e.g., NR UL).

According to an embodiment, as illustrated in FIG. 6C, after a time point t1, data of the first communication network (e.g., the NR communication network) may be transmitted and received in a TDD scheme in the first band 621. For example, the first band 621 may be used as a downlink band (NR DL) 623 of the first communication network from the time t1 to a time point t2, and may be used as an uplink band (NR UL) 624 of the first communication network from the time point t2.

According to an embodiment, as illustrated in FIG. 6D, data of the first communication network (e.g., the NR communication network) may be transmitted in the first band 621 in a FDD scheme after a time point t1. For example, from the time point t1, a partial band (e.g., 5 MHz) of the first band 621 may be used as a downlink band (NR DL) 634 of the first communication network, and the remaining band (e.g., 5 MHz) of the first band 621 may be used as an uplink band (NR UL) 633 of the first communication network.

FIG. 6E illustrates a DSS concept according to example embodiments. Referring to FIG. 6E, at least some frequency bands among all frequency bands allocated for a second communication network (LTE) may be used for transmission of first communication network (NR) data. The size of a resource (e.g., a resource block (RB)) allocated for the first communication network (NR) data may change over time as illustrated in FIG. 6E. For example, the electronic device or the base station may change the size of the resource allocated for the first communication network (NR) data in a designated time unit (e.g., every slot or every subframe (e.g., every 1 ms period)) or every scheduling period of the base station, but is not limited thereto.

According to an embodiment, the size or position of the resource allocated for said first communication network (NR) data may be changed in symbol units (e.g., 1/14 ms for normal cyclic prefix (CP), or 1/12 ms for extended CP). According to an embodiment, the resource allocated for the first communication network (NR) data in FIG. 6E may be allocated differently by subcarrier, resource block, and resource element, even for the same symbol, the same subframe, or the same time slot.

Figure 7:
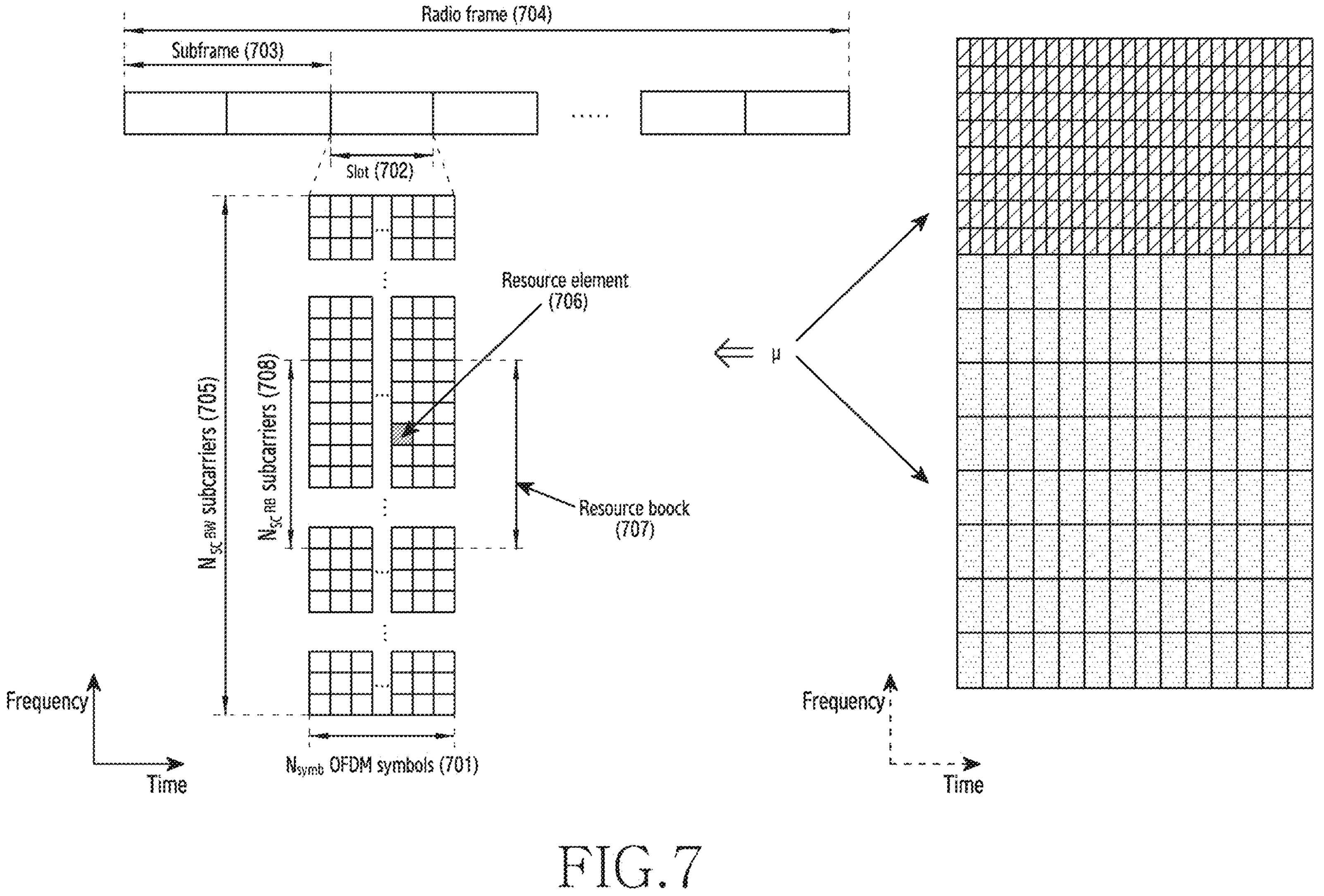
FIG. 7 illustrates an example of a radio resource domain in a wireless communication system according to an example embodiment.

FIG. 7 illustrates an example of a radio resource domain in a wireless communication system according to example embodiments. In various embodiments, the radio resource domain may include a structure of a time-frequency domain. According to an embodiment, the wireless communication system may include a NR communication system.

Referring to FIG. 7, in a radio resource domain, a horizontal axis represents a time domain and a vertical axis represents a frequency domain. The length of a radio frame 704 is 10 ms. The radio frame 704 may be a time domain interval including 10 subframes. The length of a subframe 703 is 1 ms. A constituent unit in the time domain may be an orthogonal frequency division multiplexing (OFDM) and/or a discrete fourier transform (DFT)-spread-OFDM (DFT-s-OFDM) symbol, and OFDM and/or DFT-s-OFDM symbols 701, the number of which is Nsymb, may be gathered to form one slot 702. In various embodiments, the OFDM symbol may include a symbol for transmitting and receiving a signal by using OFDM multiplexing, and the DFT-s-OFDM symbol may include a symbol for transmitting and receiving a signal by using DFT-s-OFDM or single carrier frequency division multiple access (SC-FDMA) multiplexing. The smallest transmission unit in the frequency domain is a subcarrier, and a carrier bandwidth constituting a resource grid may include a total of NscBW subcarriers 705. In addition, in the disclosure, an embodiment related to transmission and reception of a downlink signal is described for convenience of description, but this description is also applicable to an embodiment related to transmission and reception of an uplink signal.

In some embodiments, the number of slots 702 constituting one subframe 703 and the length of the slots 702 may vary depending on subcarrier spacing. The subcarrier spacing may be referred to as numerology (h). That is, the subcarrier spacing, the number of slots included in a subframe, the length of the slots, and the length of the subframe may be variably configured. For example, in an NR communication system, when the subcarrier spacing (SCS) is 15 kHz, one slot 702 may constitute one subframe 703, and the length of each of the slot 702 and the subframe 703 may be 1 ms. Also, for example, when the subcarrier spacing is 30 kHz, two slots may constitute one subframe 703. At this time, the length of the slots may is 0.5 ms and the length of the subframe is 1 ms.

In some embodiments, the subcarrier spacing, the number of slots included in a subframe, the length of a slot, and the length of the subframe may be variably applied depending on a communication system (e.g., LTE or NR). For example, in the case of an LTE system, the subcarrier interval may be 15 kHz, and two slots constitute one subframe. In this case, the length of the slots may be 0.5 ms and the length of the subframe may be 1 ms. In another example, in the case of an NR system, the subcarrier spacing (h) may be one of 15 kHz, 30 kHz, 60 kHz, 120 kHz, and 240 kHz, and the number of slots included in one subframe may be 1, 2, 4, 8, or 16 depending on the subcarrier spacing (h).

A basic unit of resources in the time-frequency domain may be a resource element (RE) 706, and the resource element 706 may be represented by an OFDM symbol index and a subcarrier index. A resource block may include multiple resource elements. In an NR system, a resource block (RB) (or physical resource block (PRB)) 707 may be NSCRB consecutive subcarriers in the frequency domain. The number of subcarriers may be NSCRB=12. The frequency domain may include common resource blocks (CRBs). A physical resource block (PRB) may be in a bandwidth part (BWP) on the frequency domain. CRB and PRB numbers may be determined differently depending the subcarrier spacing. In an LTE system, an RB may be Nsymb consecutive OFDM symbols in the time domain and NSCRB consecutive subcarriers in the frequency domain.

Figure 8A:
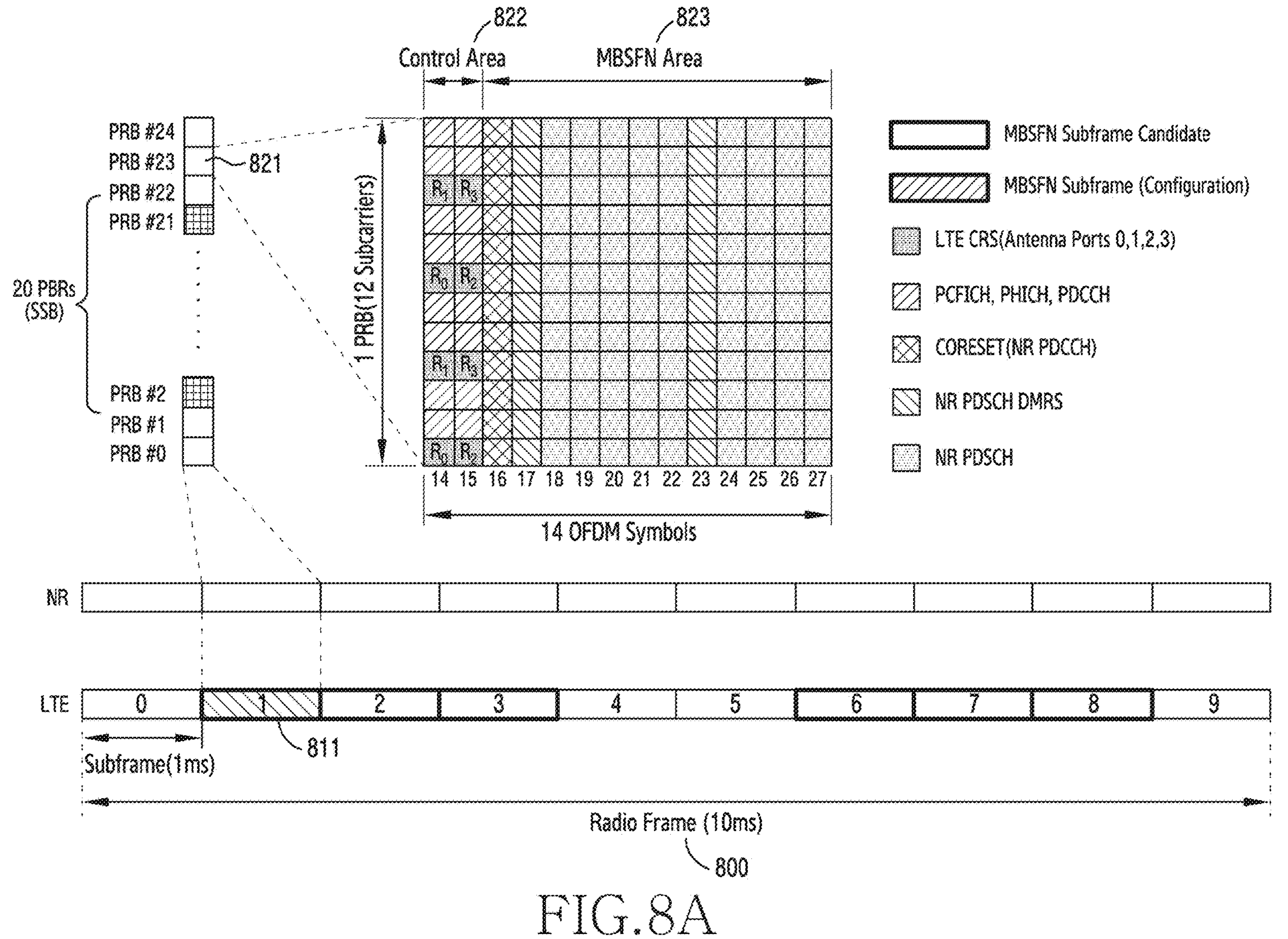
FIG. 8A illustrates a structure of a multimedia broadcast multicast service single frequency network (MBSFN) subframe in DSS according to an example embodiment.

FIG. 8A illustrates a structure of a MBSFN subframe in DSS according to an example embodiment.

Figure 8B:
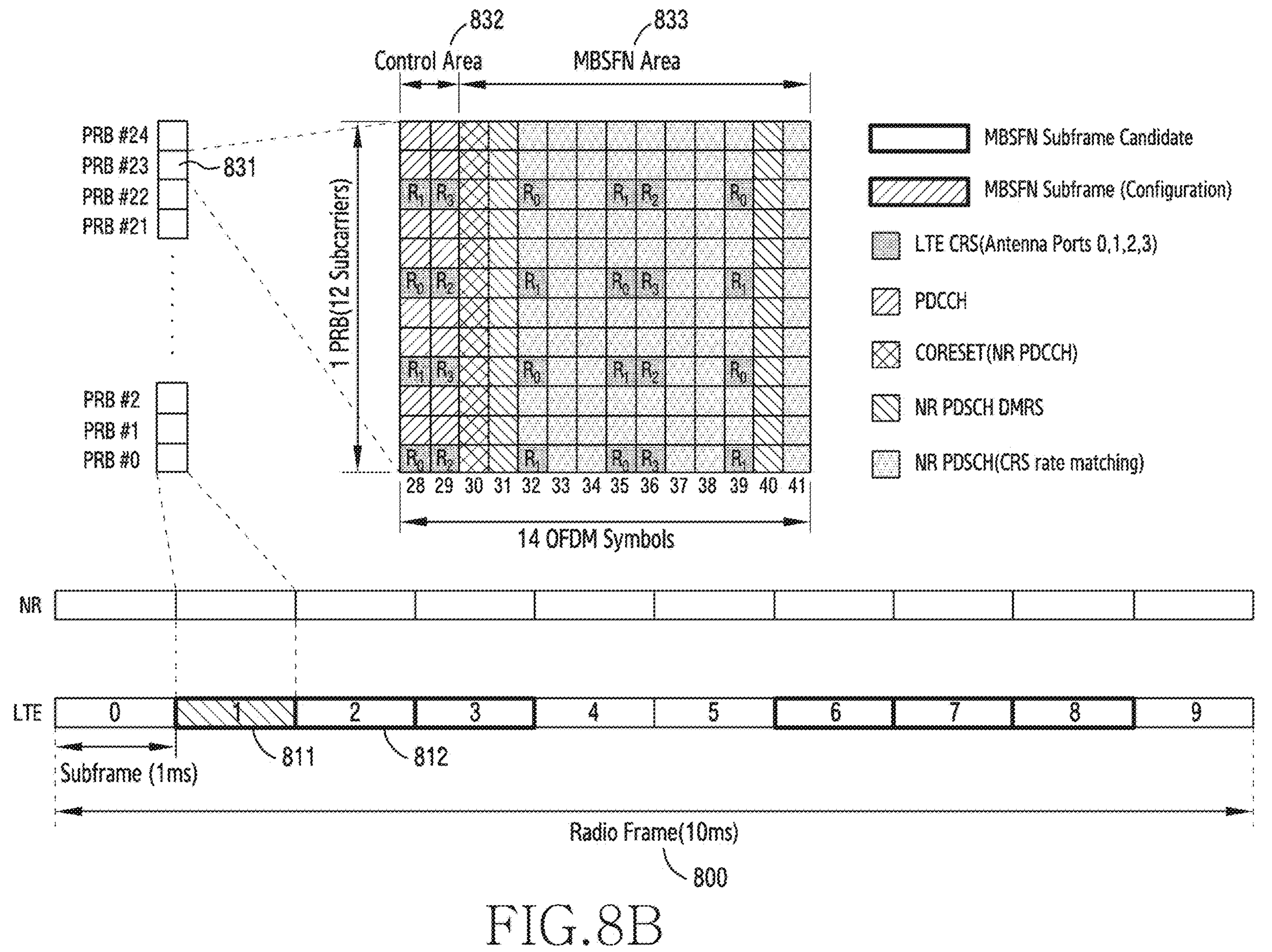
FIG. 8B illustrates a structure of a non-MBSFN subframe in DSS according to an example embodiment.

FIG. 8B illustrates a structure of a non-MBSFN subframe in DSS according to an example embodiment.

Referring to FIGS. 8A and 8B, one radio frame 800 may include 10 subframes. Assuming that the one radio frame 800 is 10 ms, each subframe may be 1 ms. The radio frame 800 may be assumed to be a radio frame configured to correspond to an LTE communication network. According to an embodiment, at least one subframe among 10 subframes constituting the one radio frame 800 may be configured as an MBSFN subframe.

According to an embodiment, information on the MBSFN subframe may be broadcast from a base station (e.g., an LTE base station (eNB)) through a system information block (SIB) 2, and the electronic device 101 may receive the information on the MBSFN subframe regardless of whether a broadcast service (e.g., eMBMS) is supported. For example, the SIB 2 may include an MBSFN subframe information element (MBSFN-SubframeConfig information element) as shown in Table 1 below.

TABLE 1

```
- MBSFN-Subframe Config
The IE MBSFN-SubframeConfig defines subframes that are reserved for MBSFN
in downlink.
      MBSFN-SubframeConfig information element
-- ASN1START
MBSFN-SubframeConfig ::=            SEQUENCE {
  radioframeAllocationPeriod          ENUMERATED {n1, n2, n4, n8,
                                         n16, n32},
  radioframeAllocationOffset          INTEGER (0..7),
  subframeAllocation                  CHOICE {
    oneFrame                            BIT STRING (SIZE(6)),
    fourFrames                          BIT STRING (SIZE(24))
  }
}
MBSFN-SubframeConfig-v1430 ::=      SEQUENCE {
  subframeAllocation-v1430            CHOICE {
    one frame-v1430                     BIT STRING (SIZE(2)),
    four frame-v143-                    BIT STRING (SIZE(8))
  }
}
-- ASN1STOP
```

"radioframeAllocationPeriod" indicates the generation period of radio frames including MBSFN subframes. "radioframeAllocationOffset" indicates the offset of radio frames including the MBSFN subframes. "oneFrame" indicates the configuration of candidate MBSFN subframes in one radio frame. In FDD, the candidate MBSFN subframes refer to frames (or, subframes) #1, #2, #3, #6, #7, and #8. In TDD, subframes #3, #4, #7, #8, and #9 may be configured as MBSFN subframe candidates, and the last 1-bit is not used. "fourFrames" indicates the configuration of candidate MBSFN subframes in four consecutive radio frames. In FDD, the candidate MBSFN subframes refer to frames #1, #2, #3, #6, #7, and #8 of each radio frame. In TDD, subframes #3, #4, #7, #8, and #9 of each radio frame may be configured as MBSFN subframe candidates, and the last 4 bits are not used. "oneFrame-1430" indicates the configuration of candidate MBSFN subframes in one radio frame. Here, the candidate MBSFN subframes indicate subframes #4 and #9 in FDD. "fourFrames-1430" indicates the configuration of candidate MBSFN subframes in four consecutive radio frames. Here, the candidate MBSFN subframes refer to subframes #4 and #9 of each radio frame in FDD.

According to example embodiments, referring to FIGS. 8A and 8B, it may be found that subframes #1, #2, #3, #6, #7, and #8 among 10 subframes of the radio frame 800 are candidates that can be configured as MBSFN subframes. According to an embodiment, when the electronic device 101 operates in a frequency division duplex (FDD) mode, subframes #1, #2, #3, #6, #7, and #8 of the radio frame 800 may be configured as MBSFN subframe candidates, and when the electronic device 101 operates in a time division duplex (TDD) mode, subframes #2, #3, #4, #7, #8, and #9 of the radio frame 800 may be configured as MBSFN subframe candidates.

FIGS. 8A and 8B illustrate the case of operating in the FDD mode, and it may be found that subframe #1 among subframes #1, #2, #3, #6, #7, and #8, which are the MBSFN subframe candidates, has been configured as an MBSFN subframe. As described above, configuration information of the MBSFN subframe may be identified through the SIB 2 transmitted by a base station.

According to an embodiment, FIG. 8A shows an example of a configuration of an MBSFN subframe when NR communication network data is allocated to the subframe and operated by DSS, and FIG. 8B shows an example of the configuration of a non-MB SFN subframe, which is not configured as an MBSFN subframe, when NR communication network data is allocated to the subframe and operated by DSS. In the description in FIG. 8B to be made later, the structure of a subframe, which is not configured as an MBSFN subframe, among MBSFN subframe candidates, is described, but this description may be applied identically or similarly to general LTE subframes (e.g., subframes #0, #4, #5, and #9 or each subframe of a radio frame other than the radio frame 800) that are not MBSFN subframe candidates.

First, referring to FIG. 8A, when subframe #1 811 has been configured as an MBSFN subframe, the MBSFN subframe may include a control area 822 and an MBSFN area 823 as illustrated. In the MBSFN subframe illustrated in FIG. 8A, the horizontal axis may correspond to a time axis and the vertical axis may correspond to a frequency axis. One MBSFN subframe may include 14 OFDM symbols along the horizontal axis. The one MBSFN subframe may include 12 subcarriers along the vertical axis to form one physical resource block (PRB) 821. For example, the one PRB 821 may include 14 OFDM symbols along the horizontal axis and 12 subcarriers along the vertical axis. A unit including one OFDM symbol and one subcarrier within the subframe may be referred to as a resource element (RE). For example, one PRB 821 may include 12×14=168 REs.

According to an embodiment, assuming that the frequency domain allocated for the DSS is 5 MHz and the subcarrier spacing (SCS) is 15 kHz, one subframe may include a total of 25 PRBs 821 along the vertical axis. According to an embodiment, a synchronization signal block (SSB) may be allocated to a total of 20 PRBs from the 2nd PRB to the 21st PRB among the 25 PRBs 821 for subframe #1 811.

Assuming that the MBSFN subframe includes a total of 14 OFDM symbols from symbol #14 to symbol #27, the control area 822 may be allocated to two left symbols, symbol #14 and symbol #15, and the MBSFN area 823 may be allocated to symbols #16 to #27.

An LTE reference signal and/or an LTE control signal may be allocated to the control area 822 of the MBSFN subframe. For example, when referring to subcarriers #0 to #11 from bottom to top along the frequency axis in the control area 822, an LTE cell-specific reference signal (CRS) may be allocated to subcarriers #0, #3, #6, and #9. A physical control format indicator channel (PCFICH), a physical hybrid-ARQ indicator channel (PHICH), and a physical downlink control channel (PDCCH) may be allocated to the remaining subcarriers (e.g., subcarriers #1, #2, #4, #5, #7, #8, #10, and #11) of the control area 822.

According to an embodiment, when the MBSFN subframe is configured as a subframe for NR communication network data by DSS, NR communication network data may be allocated to the MBSFN area 823. For example, data for NR communication network may be allocated to symbols #16 to #27. According to an embodiment, a control resource set (CORESET) corresponding to NR PDCCH may be allocated to symbol #16, NR physical downlink shared channel (PDSCH) demodulation reference signal (DMRS) may be allocated to symbols #17 and #23, and an NR physical downlink shared channel (PDSCH) may be allocated to the remaining symbols (e.g., symbols #18 to #22 and #24 to #27).

According to an embodiment, referring to FIG. 8A, when DSS is supported by using an MBSFN subframe, the entire MBSFN area 823 other than the control area 822 in one MBSFN subframe may be used for NR communication network data allocation.

Next, referring to FIG. 8B, when subframe #2 812 is a non-MBSFN subframe (e.g., a subframe for LTE data transmission) that is not configured as an MBSFN subframe, the non-MBSFN subframe may include a control area 832 and a data area 833 (e.g., an LTE data area) as illustrated. In the non-MBSFN subframe illustrated in FIG. 8B, the horizontal axis may correspond to a time axis and the vertical axis may correspond to a frequency axis. One non-MBSFN subframe may include 14 OFDM symbols along the horizontal axis. The one non-MBSFN subframe may include 12 subcarriers along the vertical axis to form one physical resource block (PRB) 831. For example, the one PRB 831 may include 14 OFDM symbols along the horizontal axis and 12 subcarriers along the vertical axis. A unit including one OFDM symbol and one subcarrier within the subframe may be referred to as a resource element (RE).

According to an embodiment, assuming that a frequency domain allocated for the DSS is 5 MHz and a subcarrier spacing (SCS) is 15 kHz, one subframe may include a total of 25 PRBs 831 along the vertical axis.

Assuming that the non-MBSFN subframe includes a total of 14 OFDM symbols from symbol #28 to symbol #41, the control area 832 can be allocated to symbols #28 and #29, which are two left symbols, and the data area 833 may be allocated to symbols #30 to #41.

An LTE reference signal and/or an LTE control signal may be allocated to the control area 832 of the non-MBSFN subframe. For example, when referring to subcarriers #0 to #11 from bottom to top along the frequency axis in the control area 822, an LTE cell-specific reference signal (CRS) may be allocated to subcarriers #0, #3, #6, and #9. A PDCCH may be allocated to the remaining subcarriers (e.g., subcarriers #1, #2, #4, #5, #7, #8, #10, and #11) of symbol #28 in the control area 822/832.

According to an embodiment, when the non-MBSFN subframe is configured as a subframe for NR communication network data by DSS, NR communication network data may be allocated to the data area 833. For example, data for a NR communication network may be allocated to symbols #30 to #41. According to an embodiment, a control resource set (CORESET) corresponding to an NR PDCCH may be allocated to symbol #30, an NR physical downlink shared channel (PDSCH) (demodulation reference signal (DMRS) may be allocated to symbols #31 and #40, and an NR physical downlink shared channel (PDSCH) may be allocated to the remaining symbols (e.g., symbols #32 to #39 and #41).

According to an embodiment, referring to FIG. 8B, even when the non-MBSFN subframe is allocated for data transmission and reception of the NR communication network, a CRS may be allocated such that the non-MBSFN subframe functions as an LTE subframe. The CRS may is a reference signal transmitted with relatively high power, and may be used for phase synchronization or channel estimation in an LTE communication network, and may be used to maintain time synchronization and frequency synchronization. For example, as illustrated in FIG. 8B, an LTE cell-specific reference signals (CRS) may be allocated to subcarriers #0, #3, #6, and #9 of symbols #32, #35, #36, and #39 in the data area 833.

When an LTE CRS is allocated to the data area 833, the base station must allocate resources to Res, to which the LTE CRS is not allocated, in the data area 833. Resource allocation related to the LTE CRS may be referred to as CRS rate matching.

According to an embodiment, information for LTE CRS rate matching for a subframe to which the DSS is applied may be transmitted in the format shown in Table 2 below in the 3GPP TS 38.331 standard document.

TABLE 2

```
- RateMatchPatternLTE-CRS
The IE RateMatchPatternLTE-CRS is used to configure a pattern to rate match
around LTE CRS. See TS 38.214 [19], clause 5.1.4.2.
      RateMatchPatternLTE-CRS information element
-- ASN1START
-- TAG-RATEMATCHPATTERNLTE-CRS-START
```

TABLE 2-continued

```
RateMatchPatternLTE-CRS ::=        SEQUENCE {
  carrierFreqDL                      INTEGER (0..16383),
  carrierBandwidthDL                 ENUMERATED {n6, n15, n25, n50, n75,
                                          n100, spare2, spare1},
  mbsfn-SubframeConfigList           EUTRA-MBSFN-SubframeConfigList
                                          OPTIONAL, -- Need M
  nrofCRS-Ports                        ENUMERATED {n1, n2, n4},
  v-Shift                              ENUMERATED {n0, n1, n2, n3, n4,
                                   n5}
}
-- TAG-RATEMATCHPATTERNLTE-CRS-STOP
-- ASN1STOP
```

"carrierFreqDL" indicates the center frequency of an LTE carrier. "carrierBandwidthDL" represents the bandwidth of an LTE carrier as the number of PRBs. "mbsfn-SubframeConfigList" indicates MBSFN subframe configuration. "nrofCRS-Ports" indicates the number of CRS ports. "v-Shift" indicates a v-shift value (e.g., a subcarrier shift value in the frequency domain) used when rate matching is performed around LTE CRS.

According to an embodiment, the non-MBSFN subframe illustrated in FIG. 8B allocates NR data (e.g., NR PDSCH) to relatively fewer REs than the MBSFN subframe illustrated in FIG. 8A due to LTE CRS rate matching.

According to an embodiment, CRS in the non-MBSFN subframe illustrated in FIG. 8B is exemplified in the case where the number of antenna ports is 4. The number and position of CRSs may be variously changed depending on a cell ID (e.g., a physical cell ID (PCI)) and the number of antenna ports.

One of the biggest goals of 5G technology is high-speed data transmission and reception using a wide frequency band. The use of a higher frequency than the LTE band reduces cell coverage due to increased path loss. In other words, higher frequencies reduce the benefits of 5G that users can use. In order to solve this problem, dynamic spectrum sharing (DSS) technology, in which LTE and NR coexist in a specific band through re-framing of an LTE band, is used.

In the DSS operation, interference between an LTE network and an NR network is largely divided into two types. The first is common reference signal (CRS) interference of an LTE base station illustrated in FIGS. 8A and 8B. The LTE base station always transmits a CRS signal at all times/frequencies used. Therefore, an NR base station using the same time and frequency band as the LTE network may not use the corresponding CRS area for data allocation. The second is interference by 5G synchronization signal block (SSB)/CSI-RS of an NR base station. An electronic device using 5G performs mobility management for channel estimation, synchronization, beam tracking, and handover through SSB or CSI-RS signals. Therefore, an LTE base station may not use the SSB and CSI-RS areas for data allocation. Therefore, the throughput performance of the electronic device is affected depending on whether a DSS band is used by an LTE cell or an NR cell. In addition, power consumption by an electronic device increases in an NR cell due to reception of a wider frequency band and SSB than in an LTE cell. Hereinafter, in example embodiments, a method for operating a DSS band by a cell of an LTE cell and an NR cell, which is more advantageous for communication, is described in consideration of the above-described factors.

Figure 9:
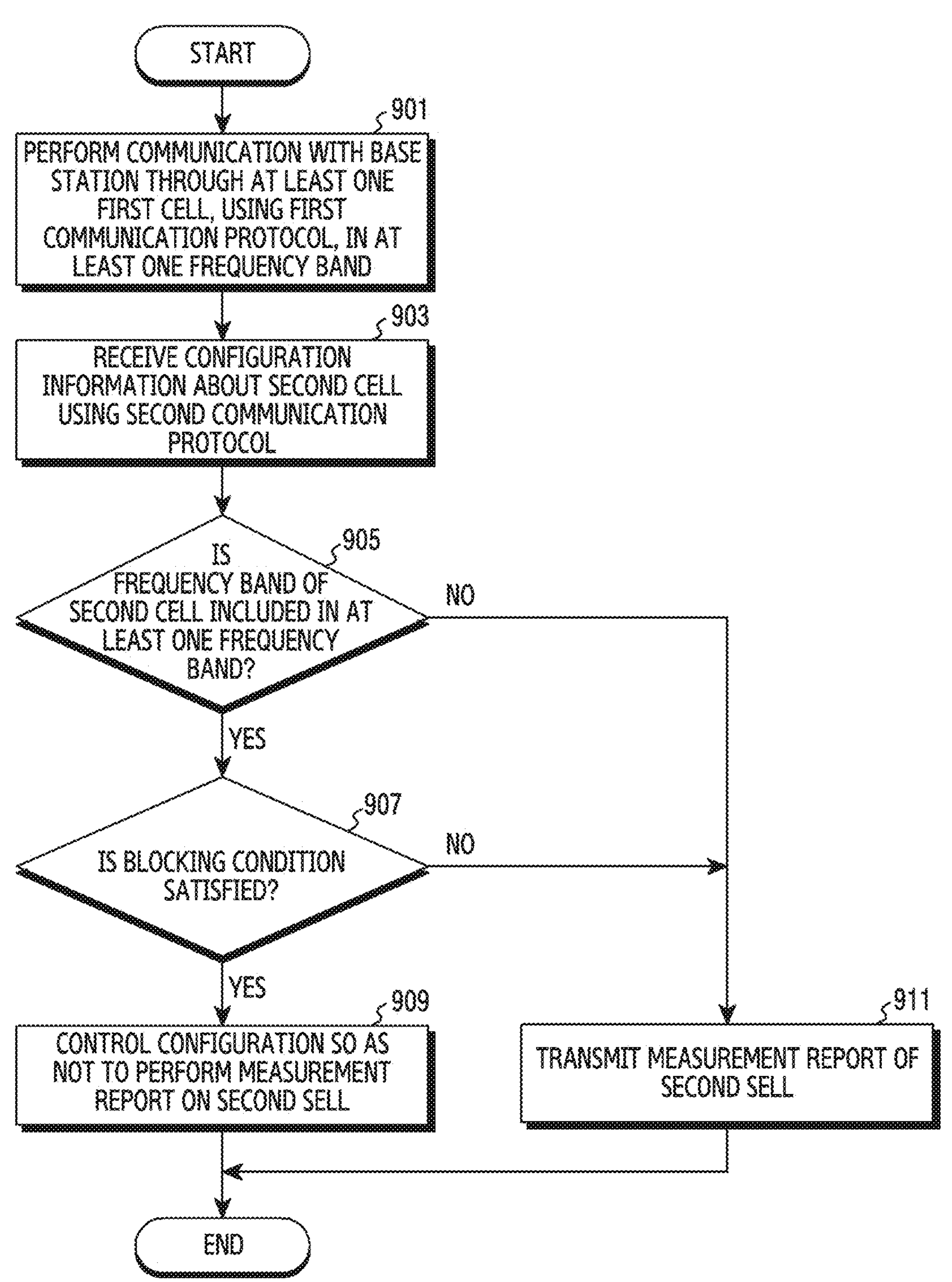
FIG. 9 illustrates the flow of operations of an electronic device according to an example embodiment.

FIG. 9 illustrates the flow of operations of an electronic device according to an example embodiment. The operations illustrated in FIG. 9 may be performed by at least one of the processor 120, the first communication processor 312, and the second communication processor 314 of the user equipment (e.g., the electronic device 101 in FIG. 1) according to various embodiments.

Referring to FIG. 9, according to an embodiment, in operation 901, the electronic device 101 may perform communication with a base station through at least one first cell using a first communication protocol in at least one frequency band. A base station may be a serving base station. The at least one first cell may be a serving cell. The at least one first cell may include a primary cell (PCell). In some embodiments, the at least one first cell may include a PCell and a secondary cell (SCell).

According to an embodiment, the electronic device 101 may be connected to two base stations (e.g., the first base station 210 and the second base station 220) through EN-DC. Here, a base station supporting the first cell may be an eNB. The first communication protocol may be LTE. According to an embodiment, the first cell may be a PCell of a master cell group (MCG) of the EN-DC. According to an embodiment, the first cell may be a SCell of the master cell group (MCG).

According to an embodiment, the electronic device 101 may be connected to two base stations (e.g., the first base station 210 and the second base station 220) through NE-DC. Here, a base station supporting the first cell may be a gNB. The first communication protocol may be NR. According to an embodiment, the first cell may be a PCell of a master cell group (MCG) of EN-DC. According to an embodiment, the first cell may be a PCell of a master cell group (MCG) of NE-DC. According to an embodiment, the first cell may be a SCell of a master cell group (MCG).

According to an embodiment, the electronic device 101 may be connected, directly or indirectly, to one base station (e.g., the second base station 220) in a standalone (SA) scheme. Here, the base station supporting the first cell may be gNB. The first communication protocol may be NR. According to an embodiment, the first cell may be a PCell of a master cell group (MCG) of EN-DC. According to an embodiment, the first cell may be a PCell of the base station.

According to an embodiment, in operation 903, the electronic device 101 may receive configuration information on a second cell using a second communication protocol. The electronic device 101 may receive the information on the second cell from the base station, that is, the serving base station in operation 901. The second communication protocol may refer to RAT that is different from the first communication protocol. According to an embodiment, when the first communication protocol is an LTE communication system, the second communication protocol may be an NR communication system. According to an embodiment, when the first communication protocol is an NR communication system, the second communication protocol may be an LTE communication system.

According to an embodiment, the configuration information on the second cell may be configuration information on measurement of the second cell. A measurement procedure may be used to find an additional cell or modify a current serving cell, such as handover, channel reselection, or SCell addition. For measurement, the base station may transmit a measurement configuration to the electronic device 101. The electronic device 101 may measure, based on the measurement configuration, neighboring cells as well as the serving cell, and may transmit the measurement result to the serving base station according to a designated configuration (e.g., periodically or by event trigger).

According to an embodiment, the configuration information on the second cell may be configuration information on a signal pattern of the second cell. When the second communication protocol is LTE, the serving base station may transmit information on a CRS pattern to the electronic device. According to the LTE standard, CRS always exists at a predetermined symbol position (e.g., #0th, #1st, or #5th) within a subframe in the entire frequency band. The base station may transmit information on the CRS pattern of an LTE cell to the electronic device. For example, the serving base station may transmit the information on the CRS pattern through the "ServingCellConfig" IE of 3GPP TS 38.331.

According to an embodiment, in operation 905, it may be determined whether the frequency band of the second cell is included in the at least one frequency band. That is, the electronic device 101 may determine whether the second cell is a dynamic spectrum sharing (DSS) cell. In the disclosure, a DSS cell refers to a cell positioned in the same frequency band as that of the serving cell while supporting RAT different from the serving cell. In other words, a DSS cell may refer to a cell in a DSS environment.

According to an embodiment, the electronic device 101 may determine whether the frequency band of the second cell is the same as the frequency band of the at least one first cell, that is, each of the at least one frequency band in operation 901. The electronic device 101 may acquire a frequency location (e.g., EUTRA-absolute radio-frequency channel number (EARFCN)) of the second cell, based on the measurement configuration received in operation 903. The electronic device 101 may identify the frequency band of the second cell through the frequency location of the second cell. Then, the electronic device 101 may determine whether the frequency band of the second cell is the same as the frequency band of the first cell previously accessed thereby. That is, the electronic device 101 may determine whether the second cell is a DSS cell by determining whether the frequency band of the second cell belongs to one or more frequency bands of the previously connected first communication protocol.

According to an embodiment, the electronic device 101 may determine whether there is the CRS pattern information. The electronic device 101 may determine whether an NR cell is related to an LTE cell, based on the CRS pattern information received in operation 903. For example, when referring to the 3GPP TS 38.331 standard, the serving cell configuration (e.g., ServingCellConfigCommon) of NR may or may not include "lte-CRS-ToMatchAround" information element (IE). The IE is parameters related to the LTE CRS pattern for rate matching of the UE (e.g., the electronic device 101 in FIG. 1). Table 2 described above may be referred to for specific parameters. Including information on a cell specific reference signal (CRS) pattern of the LTE cell in the configuration of the NR cell may imply that operation frequencies between the NR cell and the LTE cell overlap. That is, the electronic device 101 may determine whether the second cell is a DSS cell, based on whether the CRS pattern information has been received. For example, when the CRS pattern information is included in the configuration of an NR cell, the electronic device 101 may identify that an LTE cell located in the same frequency band as the NR cell is a cell located in a DSS environment.

The electronic device 101 may perform operation 907 when the frequency band of the second cell is included in the at least one frequency band. The electronic device 101 may perform operation 911 when the frequency band of the second cell is not included in the at least one frequency band.

According to an embodiment, in operation 907, the electronic device 101 may determine whether a blocking condition is satisfied. The blocking condition refers to a condition for not transmitting a measurement report. For example, the DSS environment shown in the table below may be configured for the electronic device 101.

TABLE 3

| LTE Cell | PCell | SCell#1 | SCell#2 | SCell#3 | NR DSS Cell |
|---|---|---|---|---|---|
| PCID | 48 | 48 | 48 | 48 | 48 |
| DL-Carrier | 66586 | 66535 | 1000 | 2560 | 167064 |
| Bandwidth | 20 MHz | 10 MHz | 10 MHz | 10 MHz | 10 MHz |
| Band | B66 | B66 | B2 | B5 | B5 |

In another example, the DSS environment shown in the table below may be configured for the electronic device 101.

TABLE 4

| LTE Cell | PCell | SCell#1 | SCell#2 | NR DSS Cell |
|---|---|---|---|---|
| PCID | 93 | 161 | 93 | 147 |
| DL-Carrier | 6300 | 1801 | 2850 | 371550 |
| Bandwidth | 10 MHz | 20 MHz | 20 MHz | 20 MHz |
| Band | B20 | B3 | B7 | B3 |

The electronic device 101 may perform measurement. The electronic device 101 may perform a measurement report on an NR DSS cell when a designated period arrives or a designated trigger event occurs. The electronic device 101 may transmit the measurement result to a base station. According to an embodiment, the electronic device 101 may transmit the measurement result to a serving base station, that is, a base station supporting the first cell. In this case, even when the throughput of an LTE cell in the DSS relationship with the NR cell is greater than the throughput of the NR cell, the release of the LTE cell may occur due to the measurement report on the NR cell. Accordingly, the electronic device 101 according to example embodiments may use the blocking condition so as not to transmit measurement report in a specific situation.

According to an embodiment, when high downlink throughput is required, the electronic device 101 may determine whether the blocking condition is satisfied, based on channel quality of an LTE cell and channel quality of an NR cell. The electronic device 101 may determine whether high downlink throughput is required, through a comparison of the downlink throughput with a specific threshold value (hereinafter, referred to as a DL threshold value).

According to an embodiment, when a high uplink throughput is required, the electronic device 101 may determine that an NR cell is more advantageous for communication than an LTE cell. The electronic device 101 may determine whether high uplink throughput is required, through a comparison of the uplink throughput with a specific threshold value (hereinafter, referred to as a UL threshold). When the second cell is an NR cell, the electronic device 101 may determine to perform a measurement report. That is, the electronic device 101 may determine that the blocking condition is not satisfied. When the second cell is an LTE cell, the electronic device 101 may determine not to perform a measurement report. That is, the electronic device 101 may determine that the blocking condition is satisfied.

According to an embodiment, when both high uplink throughput and high downlink throughput are not required, the electronic device 101 may determine that an LTE cell is more advantageous for communication than an NR cell. This is because the LTE cell is more robust than the NR cell in terms of mobility, and power consumption by the electronic device 101 is less power than in the NR cell. When the second cell is an NR cell, the electronic device 101 may determine not to perform a measurement report. That is, the electronic device 101 may determine that the blocking condition is satisfied. When the second cell is an LTE cell, the electronic device 101 may determine to perform a measurement report. That is, the electronic device 101 may determine that the blocking condition is not satisfied.

According to an embodiment, the blocking condition may be configured in various ways. A specific example of the blocking condition will be described with reference to FIG. 11 to be described later. The electronic device 101 may perform operation 909 when the blocking condition is satisfied. The electronic device 101 may perform operation 911 when the blocking condition is not satisfied.

According to an embodiment, in operation 909, the electronic device 101 may control a configuration so as not to perform a measurement report on the second cell. The electronic device 101 may not perform a measurement report according to the blocking condition. According to an embodiment, the electronic device 101 may not perform measurement. For example, the electronic device 101 may remove at least one measurement-related variable (e.g., VarMeasConfig and VarMeasReportList of 3GPP TS 38.331). According to another embodiment, the electronic device 101 may not perform a report even when measurement is performed. For example, the electronic device 101 may remove at least one variable (e.g., VarMeasReportList of 3GPP TS 38.331) related to a measurement report.

According to another embodiment, the electronic device 101 may not perform a measurement report in a lower layer in a way different from the way to remove the above-described variables. In relation to the electronic device 101, measurement or a configuration related to the measurement may be configured in an RRC layer. The electronic device 101 may be configured not to perform a measurement report in a lower layer (e.g., a physical layer). According to an embodiment, the blocking condition in the operation 907 may be satisfied when a period arrives or a trigger event for the measurement report occurs.

According to an embodiment, in operation 911, the electronic device 101 may transmit a measurement report on the second cell. The electronic device 101 may transmit the measurement report on the second cell, based on the measurement configuration. According to an embodiment, a report type of a report configuration of the second cell may be configured as an event trigger type. The electronic device 101 may transmit a measurement report message including a measurement result to the base station when an event corresponding to the event trigger type (e.g., event A1, A2, A3, A4, A5, or A6 in the 3GPP standard) is satisfied. For example, when an RSRP value obtained by measuring the second cell is greater than or equal to a configured threshold value, the electronic device 101 may transmit, to the base station, a measurement report message including the result of measurement of the second cell. Also, according to an embodiment, a report type of the report configuration of the second cell may be configured as a periodic type. The electronic device 101 may transmit a measurement report message including the result of measurement of the second cell to the base station whenever a period arrives.

In FIG. 9, the operation of the electronic device 101 that does not perform a measurement report through the blocking condition is described. However, unlike this embodiment, a measure, in which the electronic device 101 includes a designated value in the value included in the measurement report and the designated value instructs the base station not to perform addition, may also be understood as an example embodiment. After identifying the designated value, the base station may not use a cell, which is included in the measurement report, in SCell addition or modification.

In FIG. 9, descriptions of whether to perform a measurement report on a different RAT are made. Depending on whether the serving cell is an NR cell or an LTE cell, there may be various situations in which the electronic device 101 differently determines whether to perform a measurement report. Hereinafter, in FIGS. 10A to 10C, detailed operations of the electronic device 101 for blocking a measurement report according to example embodiments are described through exemplary situations.

Figure 10A:
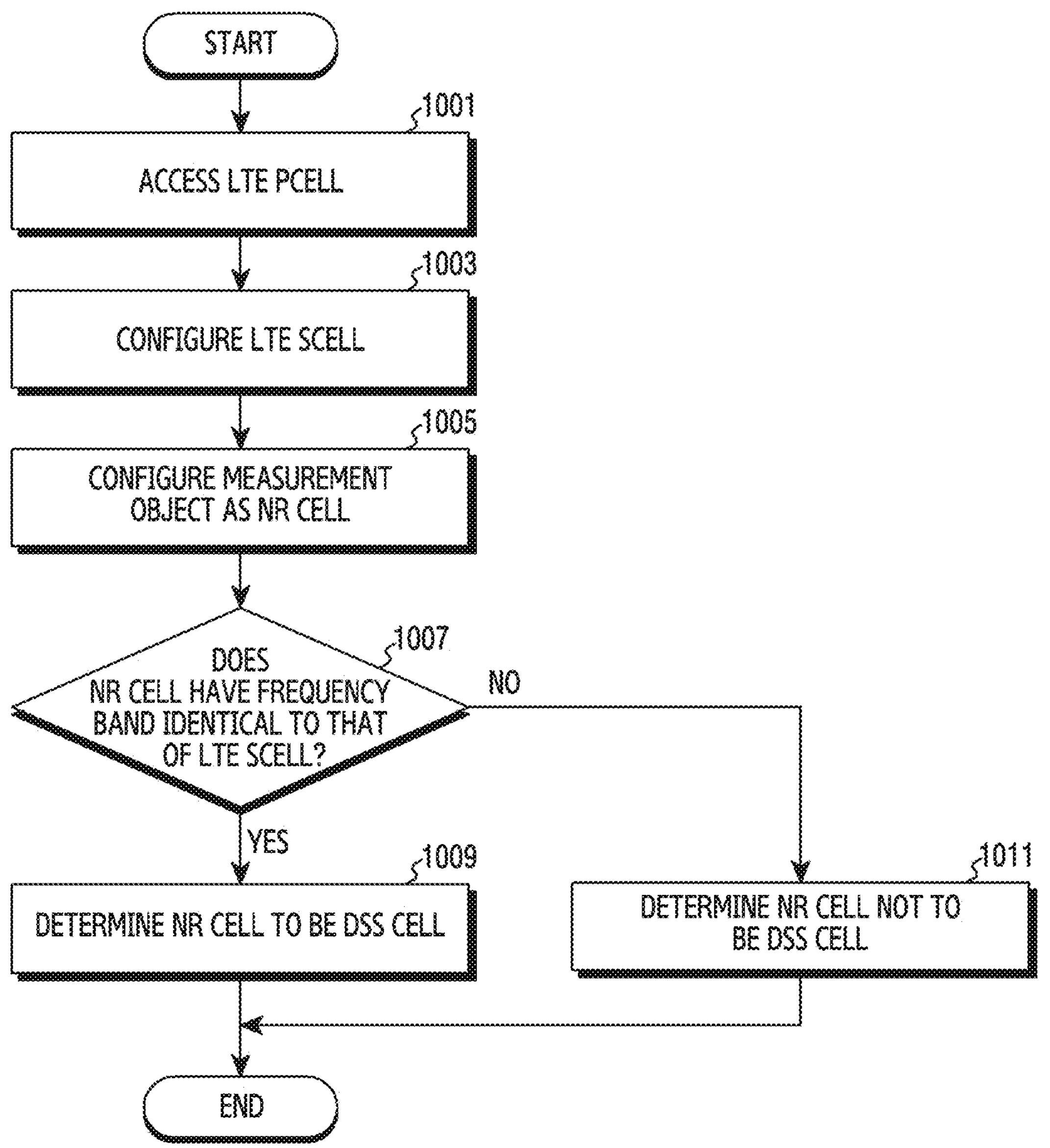
FIG. 10A illustrates the flow of operations for DSS determination of an electronic device according to an example embodiment.

FIG. 10A illustrates the flow of operations for DSS determination of the electronic device 101 according to an example embodiment. A description will be made of a situation in which in an EN-DC environment, after an LTE PCell and an LTE SCell are configured, measurement of an NR cell that is a neighbor cell is performed. It may be understood that operations in FIG. 10A are performed by the at least one processor 410 of the electronic device 101.

Referring to FIG. 10A, according to an embodiment, in operation 1001, the electronic device 101 may access an LTE PCell. The electronic device 101 may access an evolved universal mobile telecommunications system (UMTS) terrestrial radio access (E-UTRA) cell according to an LTE communication scheme. The E-UTRA cell refers to an LTE cell. The electronic device 101 may access a cell of a specific frequency band. The electronic device 101 may access a cell through synchronization with a base station (e.g., eNB), system information reception, and a random access procedure. The cell may be a PCell.

According to an embodiment, in operation 1003, the electronic device 101 may configure an LTE SCell. The electronic device 101 may receive a control message (e.g., an RRC message) for SCell addition from a base station (e.g., eNB). The electronic device 101 may identify an additional LTE cell of another frequency band. The electronic device 101 may configure the additional LTE cell as the SCell.

According to an embodiment, in operation 1005, the electronic device 101 may configure an NR cell as a measurement object. The electronic device 101 may receive a message (e.g., an RRC reconfiguration message) including a measurement configuration from the base station (e.g., eNB). The measurement object refers to an object to be measured by the electronic device 101. According to an embodiment, the measurement object may include an inter- RAT cell. For example, the measurement object may include MeasObjectNR IE of 3GPP TS 38.331, that is, an NR cell.

According to an embodiment, in operation 1007, the electronic device 101 may determine whether the NR cell has the same frequency band as the LTE SCell. The electronic device 101 may identify a frequency band of the NR cell. For example, the electronic device 101 may identify a frequency band from frequency band information (e.g., FreqBandIndicatorNR of TS 36.331 of 3GPP) of a measurement object including an NR cell. Also, for example, the electronic device 101 may identify the frequency band of the NR cell by identifying a frequency location (e.g., an absolute frequency channel number (ARFCN)) of the NR cell.

Figure 10B:
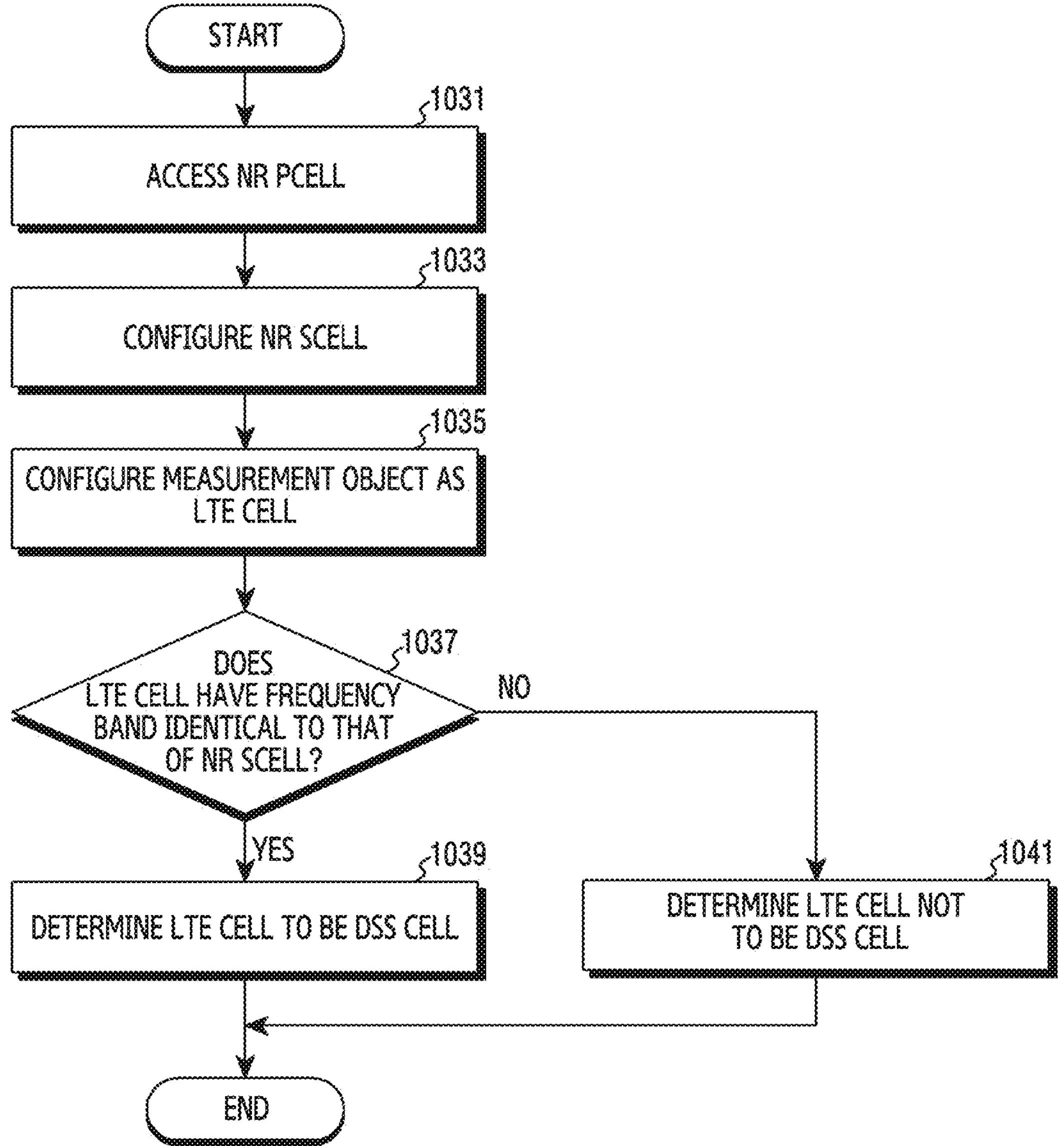
FIG. 10B illustrates the flow of operations for DSS determination of an electronic device according to an example embodiment.

The electronic device 101 may determine whether the identified frequency band is the same as the frequency band of the LTE SCell. The electronic device 101 may perform operation 1009 when the NR cell has the same frequency band as the LTE SCell. In operation 1009, the electronic device 101 may determine the NR cell as a DSS cell. That is, the electronic device 101 may identify that DSS is applied to the NR cell and the LTE SCell. The electronic device 101 may perform operation 1011 when the NR cell does not have the same frequency band as the LTE SCell. In operation 1011, the electronic device 101 may determine that the NR cell is not a DSS cell. That is, the electronic device 101 may identify that DSS is not applied to the NR cell. An electronic device connected, directly or indirectly, to an LTE base station FIG. 10B illustrates the flow of operations for DSS determination of the electronic device 101 according to an example embodiment. A description will be made of a situation in which in an NE-DC environment, after an NR PCell and an NR SCell are configured, measurement of an LTE cell that is a neighbor cell is performed. It may be understood that operations in FIG. 10B are performed by the at least one processor 410 of the electronic device 101.

Referring to FIG. 10B, according to an embodiment, in operation 1031, the electronic device 101 may access an NR PCell. The electronic device 101 may access the NR cell according to an NR communication scheme. The electronic device 101 may access a cell of a specific frequency band. The electronic device 101 may access a cell through synchronization with abase station (e.g., gNB), system information reception, and a random access procedure. The cell may be a PCell.

According to an embodiment, in operation 1033, the electronic device 101 may configure an NR SCell. The electronic device 101 may receive a control message (e.g., an RRC message) for SCell addition from a base station (e.g., gNB). The electronic device 101 may identify an additional NR cell of another frequency band. The electronic device 101 may configure the additional NR cell as the SCell.

According to an embodiment, in operation 1035, the electronic device 101 may configure an LTE cell as a measurement object. The electronic device 101 may receive a message (e.g., an RRC reconfiguration message) including a measurement configuration from the base station (e.g., gNB). The measurement object refers to an object to be measured by the electronic device 101. According to an embodiment, the measurement object may include an inter-RAT cell. For example, the measurement object may include MeasObjectEUTRA IE of 3GPP TS 38.331, that is, an LTE cell.

According to an embodiment, in operation 1037, the electronic device 101 may determine whether the LTE cell has the same frequency band as the NR SCell. The electronic device 101 may identify a frequency band of the LTE cell. For example, the electronic device 101 may identify the frequency band of the LTE cell by identifying a frequency location (e.g., an absolute frequency channel number (ARFCN)) of the LTE cell. The electronic device 101 may determine whether the identified frequency band is the same as the frequency band of the NR SCell. The electronic device 101 may perform operation 1039 when the LTE cell has the same frequency band as the NR SCell. In operation 1039, the electronic device 101 may determine the LTE cell as a DSS cell. That is, the electronic device 101 may identify that DSS is applied to the LTE cell and the NR SCell. The electronic device 101 may perform operation 1041 when the LTE cell does not have the same frequency band as the NR SCell. In operation 1041, the electronic device 101 may determine that the LTE cell is not a DSS cell. That is, the electronic device 101 may identify that DSS is not applied to the LTE cell.

Figure 10C:
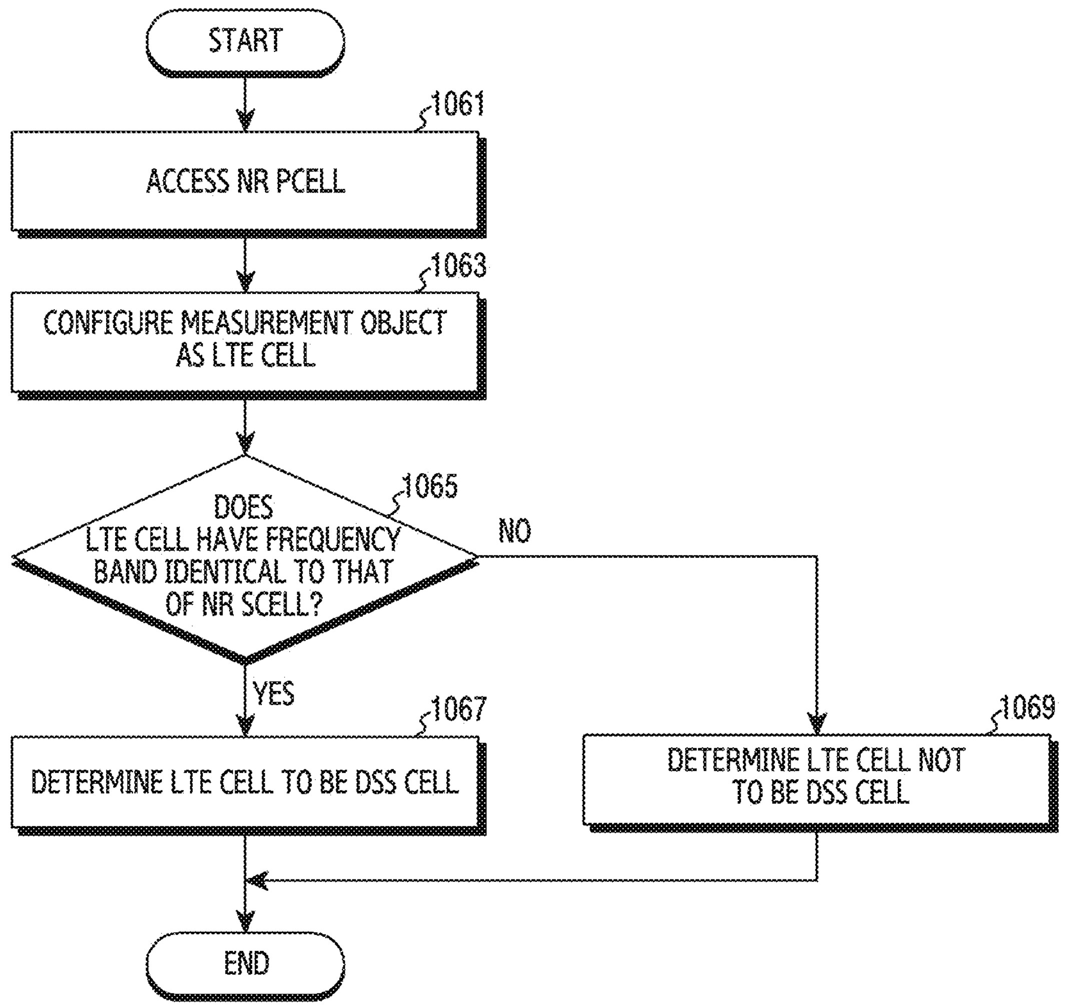
FIG. 10C illustrates the flow of operations for DSS determination of an electronic device according to an example embodiment.

FIG. 10C illustrates the flow of operations for DSS determination of the electronic device 101 according to an example embodiment. A description will be made of a situation in which in an NR standalone (SA) environment, after an NR PCell is configured, measurement of an LTE cell that is a neighbor cell is performed. It may be understood that operations in FIG. 10C are performed by the at least one processor 410 of the electronic device 101.

Referring to FIG. 10C, according to an embodiment, in operation 1061, the electronic device 101 may access an NR PCell. The electronic device 101 may access an NR cell according to an NR communication scheme. The electronic device 101 may access a cell of a specific frequency band. The electronic device 101 may access a cell through synchronization with a base station (e.g., gNB), system information reception, and a random access procedure. The cell may be a PCell.

According to an embodiment, in operation 1063, the electronic device 101 may configure an LTE cell as a measurement object. The electronic device 101 may receive a message (e.g., an RRC reconfiguration message) including a measurement configuration from the base station (e.g., gNB). The measurement object refers to an object to be measured by the electronic device 101. According to an embodiment, the measurement object may include an inter-RAT cell. For example, the measurement object may include MeasObjectEUTRA IE of 3GPP TS 38.331, that is, an LTE cell.

According to an embodiment, in operation 1065, the electronic device 101 may determine whether the LTE cell has the same frequency band as an NR Cell. The electronic device 101 may identify a frequency band of the LTE cell. For example, the electronic device 101 may identify the frequency band of the LTE cell by identifying a frequency location (e.g., an absolute frequency channel number (ARFCN)) of the LTE cell. The electronic device 101 may determine whether the identified frequency band is the same as the frequency band of the NR Cell. The electronic device 101 may perform operation 1067 when the LTE cell has the same frequency band as the NR Cell.

In operation 1067, the electronic device 101 may determine the LTE cell as a DSS cell. That is, the electronic device 101 may identify that DSS is applied to the LTE cell and the NR Cell. The electronic device 101 may perform operation 1069 when the LTE cell does not have the same frequency band as the NR Cell. In operation 1069, the electronic device 101 may determine that the LTE cell is not a DSS cell. That is, the electronic device 101 may identify that DSS is not applied to the LTE cell.

Figure 11:
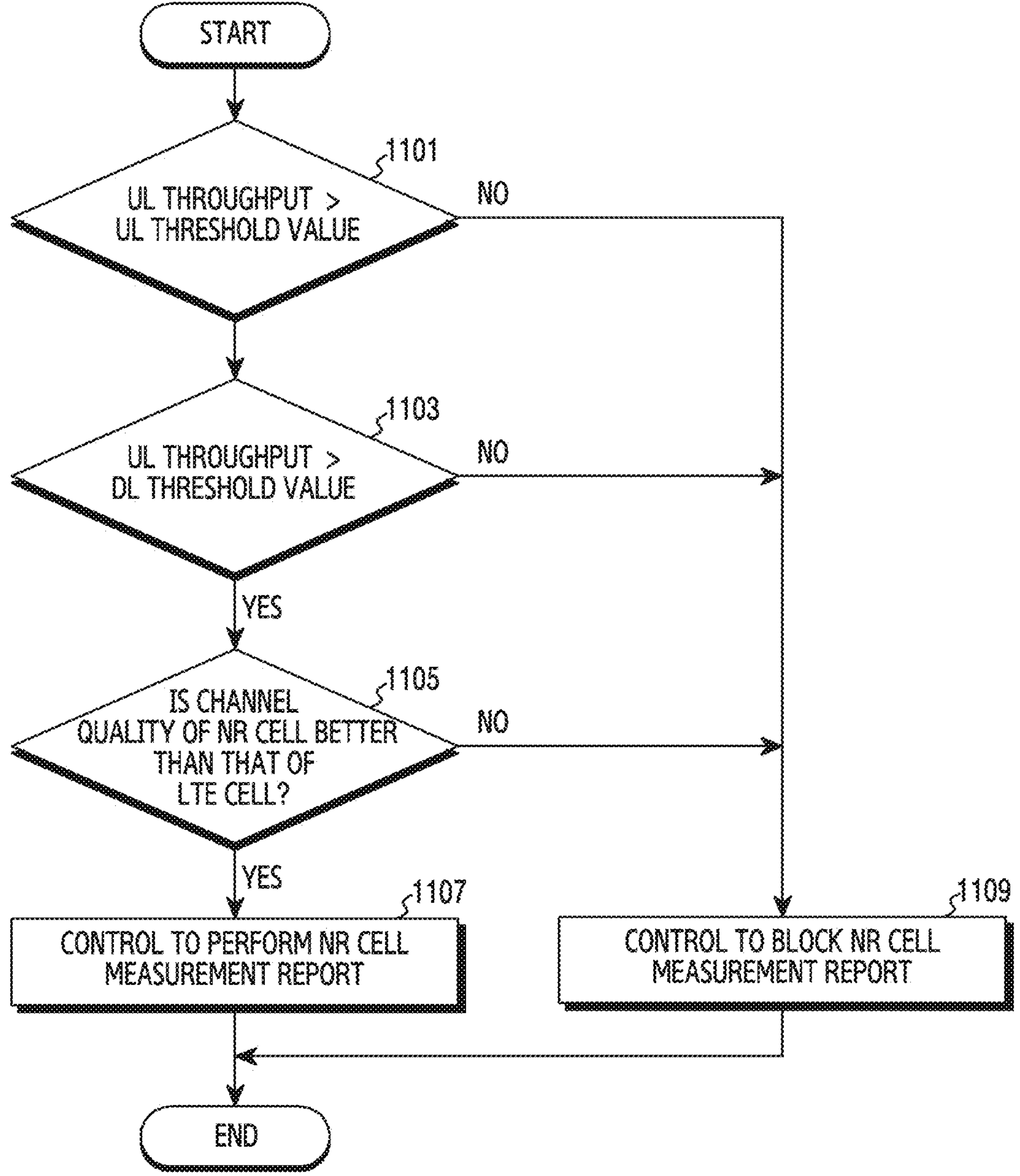
FIG. 11 illustrates a flow of operations of an electronic device for determining whether a blocking condition according to an example embodiment is satisfied.

FIG. 11 illustrates a flow of operations of an electronic device for determining whether a blocking condition according to an example embodiment is satisfied. FIG. 11 illustrates detailed conditions of the blocking condition. However, various examples of the blocking condition of the disclosure are not limited to a specific order or specific conditions illustrated in FIG. 11.

Referring to FIG. 11, according to an embodiment, in operation 1101, the electronic device 101 may determine whether UL throughput is greater than a UL threshold value. In an uplink, 5G technology, that is, an NR cell, may be advantageous for high coverage performance. The electronic device 101 may perform operation 1103 when the UL throughput is greater than the UL threshold value. The electronic device 101 may perform operation 1109 when the UL throughput is not greater than the UL threshold value.

According to an embodiment, in operation 1103, the electronic device 101 may determine whether DL throughput is greater than a DL threshold value. The electronic device 101 may perform operation 1105 when the DL throughput is greater than the DL threshold value. The electronic device 101 may perform operation 1109 when the DL throughput is not greater than the DL threshold value.

According to an embodiment, in operation 1105, the electronic device 101 may determine whether the channel quality of an NR cell is better than the channel quality of an LTE cell. That is, the electronic device 101 may determine which one of the LTE cell and the NR cell (5G DSS cell) is selected to be advantageous for communication. According to an embodiment, the electronic device 101 may acquire the channel quality of the LTE cell by measuring an LTE CRS. The electronic device 101 may acquire the channel quality of the NR cell through the intensity of a received signal of an SSB of NR. According to an embodiment, the electronic device 101 may determine whether the channel quality of the NR cell is better, based on whether the channel quality difference between the LTE cell and the NR cell is less than or equal to the threshold value. For example, the electronic device 101 may determine whether the channel quality of the NR cell is better, based on the following equation.

$$SINR_{LTE} - SINR_{5G} < TH\_SINR \quad \text{[Equation 1]}$$

Here, SINRLTE represents an SINR value of CRS of an LTE cell, and SINRSG represents an SINR value of SSB of an NR cell. TH_SINR is a designated threshold value. According to another embodiment, other channel qualities (e.g., RSRP or RSSI), in addition to the above-described SINR, may be also used.

When the channel quality of the NR cell is better than the channel quality of the LTE cell, the electronic device 101 may perform operation 1107. When the channel quality of the NR cell is not better than the channel quality of the LTE cell, the electronic device 101 may perform operation 1109.

According to an embodiment, in operation 1107, the electronic device 101 may control performing an NR cell measurement report. The electronic device 101 may transmit the NR cell measurement report to a serving base station to determine that adding the NR cell as an SCell or replacing the LTE cell is advantageous for communication in terms of throughput.

According to an embodiment, in operation 1109, the electronic device 101 may control blocking of the NR cell measurement report. That is, the electronic device 101 may determine that not transmitting the NR cell measurement report to the serving base station is advantageous for communication in terms of throughput. Since the electronic device 101 does not perform the NR cell measurement report, the serving base station does not perform any determination according to handover or SCell addition or change.

In FIG. 11, three conditions (operation 1101, operation 1103, and operation 1105) have been described as examples of blocking conditions, but example embodiments are not limited thereto. In some embodiments, only some of the above-described conditions may be used. According to an embodiment, the electronic device 101 may determine whether to perform the NR cell measurement report, based on the comparison of the UL throughput and the UL threshold value in operation 1101. In addition, according to an embodiment, the electronic device 101 may determine whether to perform the NR cell measurement report, based on the comparison of the DL throughput and the DL threshold value in operation 1103 and the channel quality comparison between the cells in operation 1105.

In some embodiments, additional conditions other than the conditions illustrated in FIG. 11 may be used. According to an embodiment, the electronic device 101 may determine whether to perform the NR cell measurement report, based on whether the electronic device 101 is in a high mobility environment. In the high-mobility environment, the CRS of the LTE cell is more effective for mobility management than the SSB of the NR cell. Therefore, the electronic device 101 may not perform the NR cell measurement report in order to select the LTE cell in the high mobility environment.

In some other embodiments, the conditions in FIG. 11 may be configured in reverse. In FIG. 11, the electronic device 101 performs the NR cell measurement report when all conditions are satisfied. However, unlike this, the electronic device 101 may perform an LTE cell measurement report when none of the conditions are satisfied. According to an embodiment, when the electronic device 101 does not require both high DL throughput and high UL throughput, the electronic device 101 may not perform the NR cell measurement report in order to reduce current consumption and obtain a gain in terms of mobility.

In addition to the above-described examples, a blocking condition may be configured for the electronic device 101 by combining the above-mentioned conditions in various ways or by omitting some of the conditions.

According to an embodiment, the electronic device may store information on a supported communication system in a memory within a modem. The electronic device may store first band information on a frequency band or a frequency band combination in the memory within the modem. According to an embodiment, the electronic device may store second band information on a frequency band or frequency band combination operated by a specific network operator in a memory of a SIM card or modem.

Upon initial access, the electronic device may search for a band of the second band information related to the network operator. When the search for the band of the second band information fails, the electronic device may perform a search based on the first band information. The electronic device 101 may access a cell in one band among multiple bands. After being connected, the electronic device may receive, from connected base stations, information instructing the electronic device 101 to measure a neighboring channel. For example, the electronic device may receive configuration information for intra-frequency measurement or inter-frequency measurement through RRC signaling. These frequencies may be configured for carrier aggregation (CA), dual connectivity (DC), or handover.

According to an embodiment, the electronic device 101 may use the first communication protocol 421 to perform communication with the first base station 210 in multiple frequency bands (e.g., B20 band, B3 band, and B7 band). Table 4 may be referred to for information on each frequency band.

After the electronic device 101 accesses a PCell through a channel access procedure, an SCell may be additionally configured by a message from the base station 200. The message may be a radio resource control (RRC) message. In an example, the message may include information on a frequency band in which wireless communication between the electronic device 101 and the first base station 210 can be performed. For example, the electronic device 101 may access the B20 band through a channel access procedure (e.g., synchronization, system information acquisition, or random access procedure) with the first base station 210 by using a 4G communication protocol (e.g., LTE). Thereafter, the electronic device 101 may receive configurations for cell addition related to the B3 band and the B7 band through an RRC message (e.g., an RRC connection reconfiguration message (RRCConnectionReconfiguration) of 3GPP TS 36.331). Here, the configurations for cell addition may be performed for the multiple bands at once or may be performed for each band. A cell in the B20 band may be a primary cell (PCell), and a cell in the B3 band or a cell in the B7 band may be at least one secondary cell (SCell).

According to an embodiment, the electronic device 101 may perform communication with the first base station 210 in multiple frequency bands (e.g., B66 band, B2 band, and B6 band) by using the first communication protocol 421. Table 3 may be referred to for information on each frequency band. The electronic device 101 may access the B66 band through a channel access procedure with the first base station 210 by using a 4G communication protocol (e.g., LTE). Thereafter, the electronic device 101 may receive configurations for cell addition related to the B66 band, the B2 band, and the B5 band. Here, the configurations for cell addition may be performed for the multiple bands at once or may be performed for each band. A cell in the B66 band may be a primary cell (PCell), and another cell in the B66 band, a cell in the B2 band, or a cell in the B5 band may be at least one secondary cell (SCell).

According to an embodiment, the electronic device 101 may perform communication with the first base station 210 through cells of multiple frequency bands (e.g., the B20 band, the B3 band, and the B7 band) by using the first communication protocol 421. The electronic device 101 may communicate with the first base station 210 in a cell of a first frequency band (e.g., the B20 band). The first frequency band may correspond to a band as a primary cell in the message. For example, the electronic device 101 may use the first communication protocol 421 to perform 4G communication with the first base station 210 through the B20 band configured as a primary cell. Thereafter, the electronic device 101 may receive additional configurations for other cells, that is, SCells, through B20. The electronic device 101 may use the first communication protocol 421 to perform 4G communication with the first base station 210 through the B3 band (SCell #1) configured as a first secondary cell. Additionally or alternatively, the electronic device 101 may perform 4G communication with the first base station 210 through the B7 band (SCell #2) configured as a second secondary cell.

According to an embodiment, in EN-DC, the electronic device 101 may be connected, directly or indirectly, to the first base station 210 supporting an LTE cell (e.g., an E-UTRA cell). The first base station 210 may be referred to as a mater cell group (MCG) or a master node (MN). The electronic device 101 may identify whether there is a second frequency band (e.g., B3 band), in which communication using the second communication protocol 422 is possible, among the multiple frequency bands (the B20 band, the B3 band, the B7 band) using the first communication protocol 421. For example, the electronic device 101 may identify whether 5G communication is possible in a frequency band corresponding to any one of cells configured in the electronic device 101.

In an example, when there is a frequency band, in which communication is possible through the second communication protocol 422, among the multiple frequency bands in which communication is possible through the first communication protocol 421, the electronic device 101 may be considered to be placed in a dynamic spectrum sharing (DSS) environment. For example, when the electronic device 101 is capable of performing 4G communication by using the first communication protocol 421 in the B20 band, the B3 band, and the B7 band, the electronic device 101 may identify whether to be able to perform 5G communication by using the second communication protocol 422 in the B3 band or the B7 band. In addition, for example, depending on whether CRS pattern information of LTE is included in configuration information (e.g., CellGroupConfig of 3GPP TS 38.331) of a cell using the second communication protocol 422, the electronic device 101 may identify whether to able to perform 5G communication using the second communication protocol 422 in the B3 band or the B7 band. Referring to Table 4, an LTE cell and an NR cell may coexist in the band B3. For rate matching in the DSS environment, configuration information of the NR cell is configured to include information on a CRS pattern of the LTE cell. The electronic device 101 may determine whether the cell using the second communication protocol 422 is in the DSS environment, based on the presence or absence of the CRS pattern information in the configuration information of the NR cell.

According to an embodiment, when there is the second frequency band in which both 4G communication and 5G communication are possible, the electronic device 101 may identify whether a blocking condition is satisfied. Here, the blocking condition is a condition for determining whether to transmit a DSS cell measurement report, and specific examples have been described with reference to FIG. 11. In an example, the electronic device 101 may determine whether the blocking condition is satisfied, based on at least one of uplink data throughput, downlink data throughput, or the moving speed of the electronic device 101.

According to an embodiment, depending on whether the blocking condition is satisfied, the electronic device 101 may determine whether to report a DSS cell measurement result for a cell of the second frequency band to at least one base station 200. For example, the electronic device 101 may determine not to report a DSS cell measurement result to the at least one base station 200 when communication using the first communication protocol is advantageous, and may determine to report the DSS cell measurement result to the base station 200 corresponding to a master node when communication using the second communication protocol is advantageous. In an EN-DC environment, the master node is the first base station 210 using the first communication protocol 421, and thus the electronic device 101 may transmit a measurement report including a DSS cell (e.g., an NR cell) measurement result to the first base station 210. In an NE-DC environment, the master node is the second base station 220 using the second communication protocol 422, the electronic device 101 may transmit a measurement report including a DSS cell (e.g., E-UTRA cell) measurement result to the second base station 220.

According to an embodiment, when downlink data throughput less than a threshold value is required, the electronic device 101 may determine that the blocking condition is not satisfied. In an example, downlink data throughput less than the threshold value is required, the electronic device 101 may determine not to report a DSS cell measurement result corresponding to the second frequency band to the base station 200 corresponding to a master node in order to perform 4G communication that consumes less power than 5G communication. In the EN-DC environment, the master node is the first base station 210 using the first communication protocol 421, and thus the electronic device 101 may determine not to transmit a measurement report including a DSS cell (e.g., NR cell) measurement result to the first base station 210. In the NE-DC environment, the master node is the second base station 220 using the second communication protocol 422, and thus the electronic device 101 may determine not to transmit a measurement report including a DSS cell (e.g., an E-UTRA cell) measurement result to the second base station 220.

According to an embodiment, when downlink data throughput equal to or higher than the threshold value is required, whether the blocking condition is satisfied may be determined based on the intensity of reference signals of the first communication protocol 421 and the second communication protocol 422. In an example, when downlink data throughput equal to or higher than the threshold value is required and when the difference between the intensity of the reference signal (e.g., a cell-specific reference signal (CRS)) of the first communication protocol 421 and the intensity of the reference signal (e.g., a synchronization signal block (SSB) or a channel state information reference signal (CSI-RS)) of the second communication protocol 422 is smaller than the threshold value, the electronic device 101 may determine not to report the DSS cell measurement result corresponding to the second frequency band to the base station 200 corresponding to a master node in order to perform 4G communication. In the EN-DC environment, the master node is the first base station 210 using the first communication protocol 421, and thus the electronic device 101 may determine not to transmit a measurement report including a DSS cell (e.g., an NR cell) measurement result to the first base station 210. In the NE-DC environment, the master node is the second base station 220 using the second communication protocol 422, and thus the electronic device 101 may determine not to transmit a measurement report including a DSS cell (e.g., an E-UTRA cell) measurement result to the second base station 220.

In another example, when the difference between the intensity of the reference signal (e.g., the cell-specific reference signal (CRS)) of the first communication protocol 421 and the intensity of the reference signal (e.g., the synchronization signal block (SSB) or the channel state information reference signal (CSI-RS)) of the second communication protocol 422 is greater than the threshold value, the electronic device 101 may determine to report the DSS cell measurement result corresponding to the second frequency band to the base station 200 corresponding to the master node in order to perform 5G communication. In the EN-DC environment, the master node is the first base station 210 using the first communication protocol 421, and thus the electronic device 101 may transmit a measurement report including a DSS cell (e.g., an NR cell) measurement result to the first base station 210. In the NE-DC environment, the master node is the second base station 220 using the second communication protocol 422, and thus the electronic device 101 may transmit a measurement report including a DSS cell (e.g., an E-UTRA cell) measurement result to the second base station 220.

According to an embodiment, when uplink data throughput is required in the second frequency band configured as a secondary cell, it may be considered that a designated condition is satisfied. In an example, when uplink data throughput is required in the second frequency band configured as a first secondary cell, the electronic device 101 may determine to report the DSS cell measurement result corresponding to the second frequency band to the base station 200 corresponding to a master node in order to perform uplink data transmission using 5G communication. In the EN-DC environment, the master node is the first base station 210 using the first communication protocol 421, and thus the electronic device 101 may transmit a measurement report including a DSS cell (e.g., an NR cell) measurement result to the first base station 210. In the NE-DC environment, the master node is the second base station 220 using the second communication protocol 422, and thus the electronic device 101 may transmit a measurement report including a DSS cell (e.g., an E-UTRA cell) measurement result to the second base station 220.

According to an embodiment, when the moving speed of the electronic device 101 is less than a designated value (e.g., 30 km/h), the blocking condition may be considered to be satisfied. In the EN-DC environment, the electronic device 101 may control an NR cell measurement result not to be reported to the first base station 210. In an example, in the NE-DC environment, when the moving speed of the electronic device 101 is less than the designated value, access to an LTE cell having higher channel estimation accuracy may be required. According to an embodiment, the electronic device 101 may determine to report a DSS cell measurement result corresponding to the second frequency band (e.g., an RSRP value corresponding to about −100dBM) to the second base station 220 in order to perform 4G communication.

According to an embodiment, the moving speed of the electronic device 101 may be obtained using the at least one sensor 440.

According to an embodiment that has not been illustrated, when there is no second frequency band, the electronic device 101 may not identify whether the blocking condition is satisfied. For example, when the electronic device 101 is capable of performing 4G communication using the first communication protocol 421 in the B20 band, the B3 band, and the B7 band but is not capable of performing 5G communication using the second communication protocol 422 in the B3 band or the B7 band, the electronic device 101 may not identify whether the blocking condition is satisfied.

According to an embodiment that has not been illustrated, the electronic device 101 may identify whether the blocking condition is satisfied regardless of whether there is the second frequency band. For example, even when the electronic device 101 is capable of performing 4G communication using the first communication protocol 421 in the B20 band, the B3 band, and the B7 band but is not capable of performing 5G communication using the second communication protocol 422 in the B3 band or the B7 band, the electronic device 101 may identify whether the blocking condition is satisfied.

According to an embodiment, the electronic device 101 may report the DSS cell measurement result for the second frequency band to the first base station 210 so as to release a wireless connection between the electronic device 101 and the first base station 210 using the first communication protocol in the second frequency band.

Figure 12:
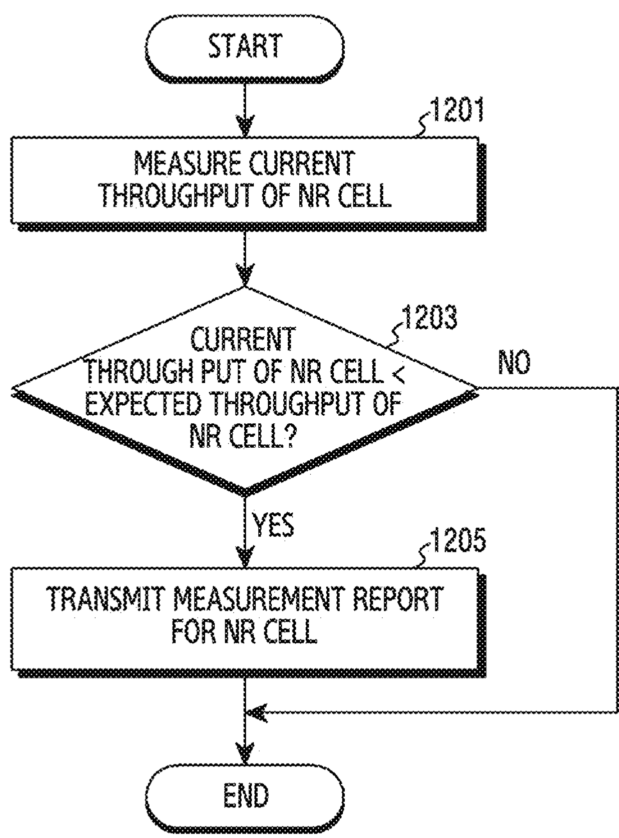
FIG. 12 illustrates the flow of an operation of an electronic device for cell release according to an example embodiment.

FIG. 12 illustrates the flow of an operation of the electronic device 101 for cell release according to an embodiment. FIG. 12 shows a situation in which the electronic device 101 has accessed an NR cell after reporting the measurement of the NR cell. It may be understood that operations in FIG. 12 are performed by the at least one processor 410 of the electronic device 101.

Referring to FIG. 12, according to an embodiment, in operation 1201, the electronic device 101 may measure current throughput of an NR cell. The current throughput of the NR cell implies cell throughput that is actually measured after access to the NR cell. The electronic device 101 may measure throughput in the NR cell accessed thereby. Even when accessing a cell to which 5G DSS is applied, the actual throughput of the NR cell may not reach predicted performance.

According to an embodiment, in operation 1203, the electronic device 101 may determine whether the current throughput of the NR cell is smaller than expected throughput of the NR cell. The electronic device 101 may obtain the expected NR cell throughput. The expected NR cell throughput may be obtained from a NR cell measurement result included in a measurement report on the NR cell. The electronic device 101 may obtain the expected NR cell throughput, based on the channel quality (e.g., signal intensity) of the NR cell.

The electronic device 101 may perform operation 1205 when the current throughput of the NR cell is smaller than the expected throughput of the NR cell. The electronic device 101 may terminate the procedure when the current throughput of the NR cell is not smaller than the expected throughput of the NR cell.

According to an embodiment, in operation 1205, the electronic device 101 may transmit a measurement report for release of the NR cell. The electronic device 101 may transmit the measurement report for release of the NR cell to a base station (e.g., the base station 220 (gNB)) providing the NR cell. The electronic device 101 may perform the measurement report, based on a designated event (e.g., event A2). For example, the designated event may be event A2. In event A2, when the signal quality of a serving cell is lower than a threshold value, a measurement report is triggered. The electronic device 101 may initiate a measurement reporting procedure when a value obtained by adding a hysteresis offset to the signal quality of the NR cell is greater than the threshold value for a predetermined time. When the measurement report on the NR cell is transmitted to the base station, the base station may release the NR cell. The electronic device 101 may expect operation with an LTE SCell, not 5G DSS.

In FIG. 12, it is illustrated that the procedure is ended after operations 1201, 1203, and 1205 are performed, but example embodiments are not limited thereto. According to an embodiment, the electronic device 101 performs the operations (operations 1201, 1203, and 1205) in FIG. 12 when an event for measuring the current throughput of the NR cell occurs. According to another embodiment, the electronic device 101 may periodically and repeatedly perform the operations (operations 1201, 1203, and 1205) in FIG. 12.

Figure 13:
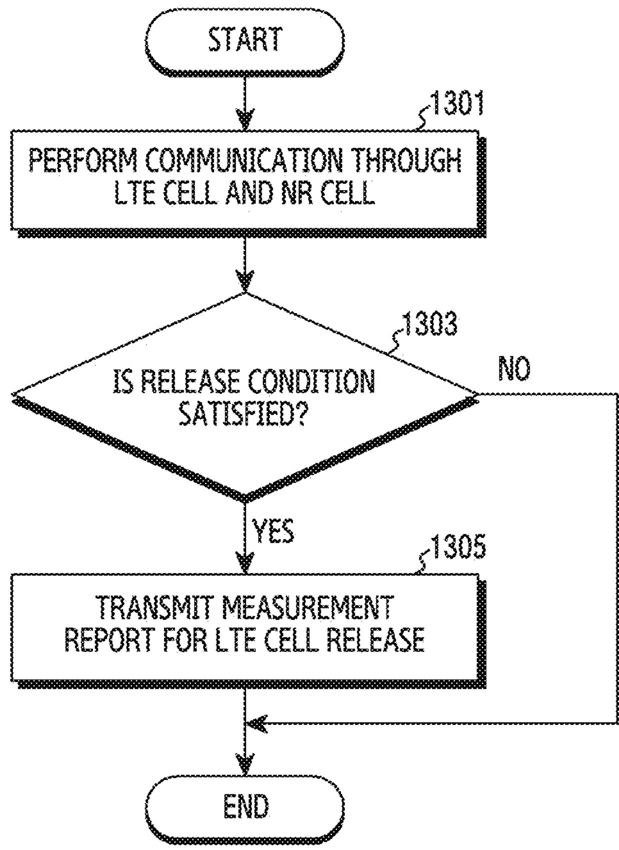
FIG. 13 illustrates the flow of an operation of an electronic device for releasing a serving cell according to an example embodiment.

FIG. 13 illustrates the flow of an operation of the electronic device 101 for releasing a serving cell according to an example embodiment. In FIG. 13 illustrate operations of the electronic device 101 for release of an LTE cell after an NR cell is added. It may be understood that the operations in FIG. 13 are performed by the at least one processor 410 of the electronic device 101.

Referring to FIG. 13, according to an embodiment, in operation 1301, the electronic device 101 may perform communication through an LTE cell and an NR cell. After performing a measurement report for 5G DSS, the electronic device 101 may be simultaneously connected to both the NR cell and the LTE by 5G DSS. Radio resources in the LTE cell are allocated by the first base station 210. Radio resources in NR cell are allocated by the second base station 220.

According to an embodiment, in operation 1303, the electronic device 101 may determine whether a release condition is satisfied. Since the electronic device 101 consumes the same time/frequency resources in the NR cell and the LTE cell, current consumed compared to a gain obtained may be large. Accordingly, the electronic device 101 may perform an operation of releasing one of the NR cell and the LTE cell, based on an additional condition.

The electronic device 101 may perform operation 1305 when the release condition is satisfied. The electronic device 101 may end the procedure when the release condition is not satisfied.

According to an embodiment, in operation 1305, the electronic device 101 may transmit a measurement report for release of the LTE cell. The electronic device 101 may transmit the measurement report to release the LTE cell. The electronic device 101 may transmit the measurement report, thereby expecting a master base station to release the LTE cell. For example, when releasing the LTE cell, the electronic device 101 may transmit a low CQI value (e.g., 0) to the first base station 210. Also, for example, when releasing the LTE cell, the electronic device 101 may transmit an LTE cell measurement report for releasing to the first base station 210 according to a designated event (e.g., event A6 in LTE). Although not illustrated in FIG. 13, when releasing the NR cell, the electronic device 101 may transmit a NR cell measurement report for releasing to the second base station 220 according to a designated event (e.g., A2 event in NR).

In FIG. 13, the procedure for determining the release condition is illustrated as a one-time operation, but example embodiments are not limited thereto. According to an embodiment, the electronic device 101 may periodically determine whether the condition in operation 1303 is satisfied.

A situation in which the electronic device 101 connected, directly or indirectly, to the first base station 210 and the second base station 220 releases a cell is as follows. For example, in an EN-DC situation, as shown in Table 4, an LTE SCell may be configured for the electronic device 101 in the B3 band, and determination of whether to measure a 5G DSS cell may be performed.

The electronic device 101 may perform different types of wireless communication depending on whether a DSS cell measurement result is reported. The electronic device 101 may access the first base station 210 in a first frequency band. Also, the electronic device 101 may be connected, directly or indirectly, to the first base station 210 and the second base station 220 in a second frequency band. That is, the second frequency band is a band in which LTE and NR coexist and may support DSS.

According to an embodiment, the electronic device 101 may identify whether a blocking condition is satisfied. In an example, the electronic device 101 may determine whether the blocking condition is satisfied, based on at least one of uplink data throughput, downlink data throughput, and a moving speed of the electronic device 101.

According to an embodiment, when the electronic device 101 determines that a designated condition, that is, the blocking condition, is satisfied, the electronic device 101 may report a DSS cell measurement result. In an example, when it is determined that the designated condition is satisfied, the electronic device 101 may report the DSS cell measurement result to a base station (e.g., the first base station 210), which is a master node. According to an embodiment, the DSS cell measurement result obtained by the electronic device 101 may include channel quality (e.g., RSRP) of a reference signal of a DSS cell (e.g., SSB or CSI-RS of an NR cell). Also, according to an embodiment, the DSS cell measurement result obtained by the electronic device 101 may include expected 5G cell throughput obtainable before the electronic device 101 actually operates.

According to an embodiment, when the electronic device 101 determines that the designated condition, that is, the blocking condition, is not satisfied, the electronic device 101 may not report the DSS cell measurement result. In an example, when it is determined that the blocking condition is not satisfied, the electronic device 101 may not report the DSS cell measurement result to the first base station 210.

According to an embodiment, when the electronic device 101 reports the DSS cell measurement result, the communication connection with a cell using the first communication protocol 421 in the second frequency band (e.g., B3) may be released. In an example, when the electronic device 101 reports the DSS cell measurement result to the first base station 210, an SCell using the first communication protocol 421 in the second frequency band (e.g., B3) may be released.

According to an embodiment, when the SCell of the second frequency band (e.g., B3) is released, the electronic device 101 may communicate with the first base station 210 in an LTE cell of the first frequency band (e.g., B20) and may communicate with the second base station 220 in an NR cell of the second frequency band (e.g., N3)

According to an embodiment, when the electronic device 101 does not report the DSS cell measurement result, the electronic device 101 may perform wireless communication with the first base station 210 in a cell of the first frequency band (e.g., B20) and a cell of the second frequency band (e.g., B3).

Figure 14:
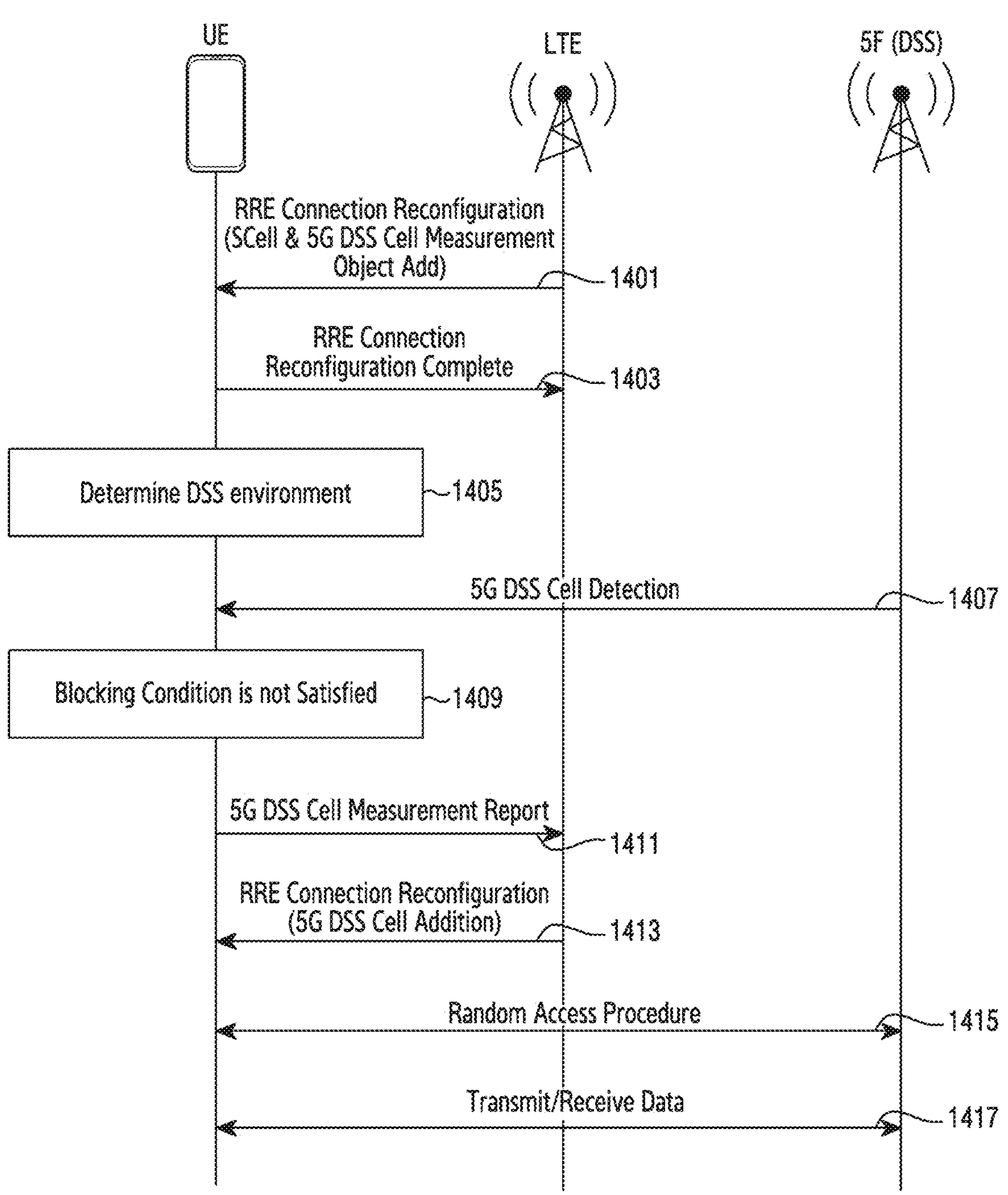
FIG. 14 illustrates an example of signaling among an electronic device, a first base station, and a second base station for DSS according to an example embodiment.

FIG. 14 illustrates an example of signaling among the electronic device 101, the first base station 210, and the second base station 220 for DSS according to an embodiment. The first base station 210 may be an eNB supporting an E-UTRA cell. The second base station 220 may be a gNB supporting an NR cell. FIG. 14 illustrates a situation for transmitting a measurement report including an NR cell measurement result in EN-DC is described, but example embodiments are not limited to the situation illustrated in FIG. 14. Operations in FIG. 14 may also be identically or similarly applied to a measurement report including an LTE cell measurement result in NE-DC or a measurement report including an LTE cell measurement result in NR standalone (NR SA).

Referring to FIG. 14, the electronic device 101 may perform 5G communication with the second base station 220 (or the third base station 200) depending on whether a DSS cell measurement result is reported.

According to an embodiment, in operation 1401, the first base station 210 may transmit an RRC connection reconfiguration message to the electronic device 101. The RRC connection reconfiguration message may be an RRC connection reconfiguration message of 3GPP TS 36.331. The RRC connection reconfiguration message may include measurement configuration. The measurement configuration may be related to configuration for a measurement report. The measurement configuration may include information on a cell as a measurement object. The cell information may include information on at least one E-UTRA cell or at least one NR cell. According to an embodiment, the information on the cell may include information on the frequency location of the cell (e.g., ARFCN). According to an embodiment, the information on the cell may include information on a frequency band (e.g., FreqBandIndicatorNR of TS 36.331 of 3GPP).

The electronic device 101 may receive the RRC connection reconfiguration message from the first base station 210. The electronic device 101 may be configured based on the measurement configuration included in the RRC connection reconfiguration message. According to an embodiment, the measurement object may include information on an E-UTRA cell, that is, an LTE cell. The electronic device 101 may measure CRS transmitted from an LTE cell of the first base station 210. For example, the electronic device 101 may acquire RSRP of the LTE cell by measuring CRS. According to an embodiment, the measurement object may include information on an NR cell. The electronic device 101 may measure SSB or CSI-RS transmitted from an NR cell of the second base station 220. For example, the electronic device 101 may acquire RSRP of the NR cell by measuring SSB or CSI-RS.

According to an embodiment, the electronic device 101 may perform an operation of reconfiguring a radio resource control (RRC) connection with the first base station 210 in multiple frequency bands (e.g., B20 band, B3 band, and B7 band).

According to an embodiment, in operation 1403, the electronic device 101 may transmit an RRC connection reconfiguration complete message to the first base station 210. The RRC connection reconfiguration complete message may be an RRC connection reconfiguration complete message of 3GPP TS 36.331. The electronic device 101 may transmit the RRC connection reconfiguration complete message to the first base station in response to the RRC connection reconfiguration message.

According to an embodiment, in operation 1405, the electronic device 101 may determine a DSS environment. The electronic device 101 may determine whether a cell indicated by the measurement object is a DSS cell. This is because when the cell indicated by the measurement object shares the same frequency band with a cell currently configured in the electronic device 101, it may be advantageous in terms of throughput that the electronic device 101 does not perform a measurement report on the cell indicated by the measurement object in a specific situation. According to an embodiment, the electronic device 101 may identify a second frequency band (e.g., the B3 band) which is in the DSS environment. In an example, the electronic device 101 may identify whether there is the second frequency band, in which 4G communication and 5G communication are possible, in the DSS environment.

According to an embodiment, the electronic device 101 may identify a frequency band of the cell indicated by the measurement object by using information on the frequency location or frequency band of the cell indicated by the measurement object. The electronic device 101 may determine whether the identified frequency band is the same as a frequency band of a cell currently configured for the electronic device 101 or a frequency band of each of cells. Although not illustrated in FIG. 14, according to another embodiment, the electronic device 101 may determine the DSS environment, based on whether cell configuration information (e.g., CellGroupConfig of 3GPP TS 38.331) of the NR cell includes information on a CRS pattern.

According to an embodiment, in operation 1407, the electronic device 101 may search for a 5G DSS cell, that is, an NR cell. The electronic device 101 may detect an NR cell according to a frequency location indicated by the measurement object. In an example, the electronic device 101 may search for an NR cell of the second base station 220 capable of performing wireless communication in the second frequency band (e.g., the B3 band) that is in the DSS environment.

According to an embodiment, in operation 1409, the electronic device 101 may determine whether a blocking condition is satisfied. Although not illustrated in FIG. 14, when the blocking condition is satisfied, the electronic device 101 may not transmit a measurement report on the NR cell. The electronic device 101 may control the measurement report not to be transmitted. Configuring the NR cell to the electronic device 101 is disadvantageous to throughput or communication performance of the electronic device 101, the blocking condition is a condition for preventing or reducing a chance of the electronic device 101 from performing the measurement report on the NR cell. When the blocking condition is not satisfied, the electronic device 101 may transmit the measurement report on the NR cell.

According to an embodiment, the electronic device 101 may identify cell throughput in 5G, and may determine whether there is a gain during communication using 5G. In an example, the electronic device 101 may identify cell throughput in 5G in the second frequency band (e.g., the B3 band) which is in the DSS environment, and may identify whether 5G communication has an advantage over 4G communication in the second frequency band (e.g., the B3 band) which is in the DSS environment. For example, in consideration of downlink data throughput, uplink data throughput, or a moving speed of the electronic device 101 in the B3 band which is in the DSS environment, the electronic device 101 may identify whether 5G communication has an advantage over 4G communication in the band B3.

According to an embodiment, the electronic device 101 may determine whether to report a DSS cell measurement result. In an example, based on whether 5G communication has an advantageous over 4G communication in the second frequency band (e.g., the B3 band) which is in the DSS environment, the electronic device 101 may determine whether to report the DSS cell measurement result to the first base station 210 (or the third base station 200).

According to an embodiment, in operation 1411, the electronic device 101 may transmit a measurement report including an NR cell measurement result to the first base station 210 which is a master node. The first base station 210 may receive the measurement report from the electronic device 101.

According to an embodiment, when it is determined that 5G communication has an advantageous over 4G communication in the second frequency band (e.g., the B3 band) which is in the DSS environment, the electronic device 101 may report the DSS cell measurement result to the first base station 210 (or the third base station 200) in operation 1411.

According to an embodiment, in operation 1413, the first base station 210 may transmit an RRC connection reconfiguration message to the electronic device 101. The RRC connection reconfiguration message may include configuration for adding an NR cell. The RRC connection reconfiguration message includes addition of gNB which is a 5G node, and thus may include configuration for SN addition. The electronic device 101 may receive the RRC connection reconfiguration message for adding the NR cell from the first base station 210.

According to an embodiment, after reporting the DSS cell measurement result, the electronic device 101 may receive the RRC connection reconfiguration message from the first base station 210. In an example, the electronic device 101 may report the DSS cell measurement result to the first base station 210 and may receive the RRC connection reconfiguration message from the first base station 210 in response to the reporting. Thereafter, for release of a connection to an LTE cell of the first base station 210 in the second frequency band (e.g., the B3 band) which is in the DSS environment, the electronic device 101 may transmit a measurement report on the LTE cell to the first base station 210.

According to an embodiment, in operation 1415, the electronic device 101 may perform a random access procedure with the second base station 220. The electronic device 101 may perform the random access procedure with the second base station 220 in order to access a new NR cell. The electronic device 101 may transmit a random access preamble to the second base station 220. The second base station 220 may transmit a random access response to the electronic device 101. According to an embodiment, the electronic device 101 may perform a random access procedure with the second base station 220. The electronic device 101 may perform the random access procedure with the second base station 220 in order to access a new NR cell. The electronic device 101 may transmit a random access preamble to the second base station 220. The second base station 220 may transmit a random access response to the electronic device 101. In an example, the electronic device 101 may perform the random access procedure with the second base station 220, and may perform 5G (or NR) communication with the second base station 220 in the second frequency band (e.g., N3 band (refers to the B3 band of NR system)) in the DSS environment.

According to an embodiment, in operation 1417, the electronic device 101 may transmit or receive data to or from the second base station 220 through an NR cell. The NR cell may be configured for the electronic device 101. In the DSS environment, the NR cell may share the same frequency band as a cell configured through the first base station 210. Although not illustrated in FIG. 14, in order to improve communication performance of the electronic device 101, the electronic device 101 may transmit an additional measurement report to the first base station 210 to release the LTE cell.

The electronic device 101 may more efficiently use radio resources in the DSS environment by reporting an additional DSS cell measurement result.

According to an embodiment, after reporting the DSS cell measurement result, the electronic device 101 may measure actual 5G cell throughput. In an example, the electronic device 101 may measure current 5G cell throughput capable of being measured when the electronic device 101 operates, in addition to expected 5G cell throughput included in the DSS cell measurement result. The actual 5G cell throughput may be measured at least partially based on a program (e.g., an application) executed by the electronic device 101.

According to an embodiment, the electronic device 101 may determine whether the current 5G cell throughput is smaller than the expected 5G cell throughput. As described with reference to FIG. 12, the electronic device 101 may obtain the expected 5G cell throughput, based on a 5G cell measurement result included in a previously reported measurement report.

According to an embodiment, when the actual 5G cell throughput is smaller than the expected 5G cell throughput, the electronic device 101 may report the additional DSS cell measurement result. In an example, when a cell of the second frequency band is in the DSS environment, the electronic device 101 may report the additional DSS cell measurement result to the first base station 210 or the second base station 220. In the DC environment, the SN measurement report may vary depending on whether signaling radio bearer (SRB) 3 is configured.

According to an embodiment, when the actual 5G cell throughput is greater than the expected 5G cell throughput, the electronic device 101 may not report the additional DSS cell measurement result. In this case, the electronic device 101 may maintain 5G communication with the second base station 220 in the frequency band which is in the DSS environment.

According to an example embodiment, an electronic device may include at least one antenna, a wireless communication circuit connected, directly or indirectly, to the at least one antenna and configured to support a first communication protocol and a second communication protocol, and at least one processor connected, directly or indirectly, to the wireless communication circuit. The at least one processor may control the wireless communication circuit to communicate with a base station through at least one first cell using the first communication protocol in at least one frequency band, and may control the wireless communication circuit to receive, from the base station, configuration information on a second cell using the second communication protocol different from the first communication protocol. The at least one processor may determine, based on the configuration information on the second cell, whether a frequency band of the second cell is included in the at least one frequency band, and may determine whether a blocking condition is satisfied when the frequency band is included in the at least one frequency band. The at least one processor may control the wireless communication circuit to transmit a measurement result of the second cell to the base station when the blocking condition is not satisfied, and may control the measurement result of the second cell not to be reported to the base station when the blocking condition is satisfied.

According to an example embodiment, the configuration information may include a measurement configuration in which the second cell is a measurement object.

The configuration information on the second cell may include at least one of frequency location information of the second cell or frequency band information of the second cell.

According to an example embodiment, the configuration information may include cell-specific reference signal (CRS) pattern information transmitted in an evolved universal mobile telecommunications system (UMTS) terrestrial radio access (E-UTRA) cell.

According to an example embodiment, the at least one processor may control the wireless communication circuit to report the measurement result of the second cell to the first base station and receive, from the base station, a control message for addition of another base station supporting the second cell.

According to an example embodiment, the at least one processor may control the wireless communication circuit to receive, from the base station, a control message for releasing a cell, among the at least one first cell, which is related to the frequency band of the second cell and the first communication protocol.

According to an example embodiment, the first communication protocol may be a 4th generation (4G) or long-term evolution (LTE) communication protocol, and the second communication protocol may be a 5th generation (5G) or new radio (NR) communication protocol.

According to an example embodiment, the at least one processor may control the wireless communication circuit to communicate with another base station in the second cell through the second communication protocol, the base station may be related to an eNB supporting the first communication protocol, and the other base station may be related to a gNB supporting the second communication protocol. According to an example embodiment, the at least one frequency band may include a B20 band, a B3 band, or a B7 band, the B20 band may provide a primary cell (PCell), and the frequency band of the second cell may be the B3 band.

According to an example embodiment, the at least one frequency band may include a B66 band, a B2 band, or a B5 band, the B66 band may provide a primary cell (PCell), and the frequency band of the second cell may be the B5 band.

According to an example embodiment, when downlink data throughput less than a downlink threshold value is required, the at least one processor may determine that the blocking condition is satisfied.

According to an example embodiment, the at least one processor may acquire first channel quality of a reference signal of the first communication protocol and second channel quality of the second communication protocol when downlink data throughput equal to or higher than the downlink threshold value is required, and may determine that the blocking condition is satisfied when the second channel quality is greater than the first channel quality by a threshold value or more. The at least one processor may determine that the blocking condition is not satisfied when the second channel quality is not greater than the first channel quality by the threshold value or more.

According to an example embodiment, the at least one processor may determine that the blocking condition is satisfied when uplink data throughput equal to or higher than an uplink threshold value is required in the frequency band of the second cell.

According to an example embodiment, the electronic device may further include at least one sensor, wherein the at least one processor may acquire a moving speed of the electronic device by using the at least one sensor, and may determine that the blocking condition is satisfied when the moving speed of the electronic device is less than a designated value.

According to an example embodiment, an operation method performed by an electronic device may include controlling a wireless communication circuit to communicate with a base station in at least one first cell of at least one frequency band through a first communication protocol, receiving, from the base station, configuration information on a second cell related to a second communication protocol different from the first communication protocol, determining, based on the configuration information on the second cell, whether a frequency band of the second cell is included in the at least one frequency band, determining whether a blocking condition is satisfied, when the frequency band is included in the at least one frequency band, controlling the wireless communication circuit to transmit a measurement result of the second cell to the base station when the blocking condition is not satisfied, and controlling the measurement result of the second cell not to be reported to the base station when the blocking condition is satisfied.

According to an example embodiment, the method may further include determining that the blocking condition is satisfied when downlink data throughput less than a downlink threshold value is required.

According to an example embodiment, the method may further include acquiring first channel quality of a reference signal of the first communication protocol and second channel quality of the second communication protocol when downlink data throughput equal to or higher than the downlink threshold value is required, determining that the blocking condition is satisfied when the second channel quality is greater than the first channel quality by a threshold value or more, and determining that the blocking condition is not satisfied when the second channel quality is not greater than the first channel quality by the threshold value or more.

According to an example embodiment, the method may further include determining that the blocking condition is satisfied when uplink data throughput equal to or higher than an uplink threshold value is required in the frequency band of the second cell.

According to an example embodiment, the method may further include acquiring a moving speed of the electronic device by using at least one sensor, and determining that the blocking condition is satisfied when the moving speed of the electronic device is equal to or greater than a designated value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities, and some of the multiple entities may be separately disposed in different components.

According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:

at least one antenna;

a wireless communication circuitry electrically connected with the at least one antenna and supporting a first communication protocol and a second communication protocol;

at least one processor, electrically connected with the wireless communication circuitry; and memory storing instructions that, when executed by the at least one processor individually or collectively, cause the electronic device to:

receive, from a base station on a first cell associated with the first communication protocol, configuration information on a second cell associated with the second communication protocol;

determine that a frequency band of the second cell is included in a frequency band of the first cell, based on the configuration information;

in response to a downlink (DL) throughput of the electronic device being greater than a threshold value:

compare a first measurement result for the first cell and a second measurement result for the second cell, and transmit, to the base station, the second measurement result for the second cell based on the second measurement result being greater than the first measurement result, wherein, in response to the DL throughput being equal to or less than the threshold value, the second measurement result for the second cell is not to be transmitted to the base station.

2. The electronic device of claim 1, wherein the configuration information comprises a measurement configuration in which the second cell is a measurement object, and wherein the configuration information comprises at least one of: frequency location information of the second cell, or frequency band information of the second cell.

3. The electronic device of claim 1, wherein the configuration information comprises cell-specific reference signal (CRS) pattern information transmitted in an evolved universal mobile telecommunications system (UMTS) terrestrial radio access (E-UTRA) cell.

4. The electronic device of claim 1, wherein the base station corresponds to a first base station, and wherein the instructions further cause the electronic device to:

receive, from the base station, a control message for addition of second base station supporting the second cell.

5. The electronic device of claim 4, wherein the instructions further cause the electronic device to:

receive, from the base station, a control message for releasing the first.

6. The electronic device of claim 4, wherein the instructions, when executed by the at least one processor, cause the electronic device to:

perform a random access procedure with the second base station.

7. The electronic device of claim 1, wherein the first communication protocol is long-term evolution (LTE), and wherein the second communication protocol is a new radio (NR).

8. The electronic device of claim 7, wherein the base station corresponds to a first base station, wherein the instructions further cause the electronic device to communicate with a second base station on the second cell through the second communication protocol, wherein the first base station supports the first communication protocol, and wherein the second base station supports the second communication protocol.

9. The electronic device of claim 1, wherein the first cell corresponds to a primary cell (PCell), and wherein the second cell corresponds to a secondary cell (SCell).

10. The electronic device of claim 1, wherein the instructions, when executed by the at least one processor, cause the electronic device to:

in response to an uplink (UL) throughput of the electronic device being greater than a second threshold value, transmit, to the base station, the second measurement result for the second cell, and wherein, in response to the UL throughput being less than or equal to the second threshold value, the second measurement result for the second cell is not to be transmitted to the base station.

11. The electronic device of claim 1, wherein the instructions, when executed by the at least one processor, cause the electronic device to:

camp on the second cell, measure a throughput of the second cell, and in response to the throughput of the second cell being less than a throughput expected for the second cell, transmit, to the base station, a release message for the second cell.

12. The electronic device of claim 1, further comprising:

at least one sensor, wherein the instructions, when executed by the at least one processor, cause the electronic device to obtain a moving speed of the electronic device by using the at least one sensor, wherein, in response to the moving speed being less than a third threshold value, a communication using the first cell is performed, and wherein, in response to the moving speed being greater than or equal to the third threshold value, a communication using the second cell is performed.

13. A method performed by an electronic device, the method comprising:

receiving, from a base station on a first cell associated with a first communication protocol, configuration information on a second cell associated with to a second communication protocol;

determining that a frequency band of the second cell is included in a frequency band of the first cell, based on the configuration information;

in response to a downlink (DL) throughput of the electronic device being greater than a threshold value:

comparing a first measurement result for the first cell and a second measurement result for the second cell; and transmitting, to the base station, the second measurement result for the second cell based on the second measurement result being greater than the first measurement result, wherein, in response to the DL throughput being equal to or less than the threshold value, the second measurement result for the second cell is not to be transmitted to the base station.

14. The method of claim 13, wherein the configuration information comprises a measurement configuration in which the second cell is a measurement object, and wherein the configuration information comprises at least one of frequency location information of the second cell, or frequency band information of the second cell.

15. The method of claim 13, wherein the configuration information comprises cell-specific reference signal (CRS) pattern information transmitted in an evolved universal mobile telecommunications system (UMTS) terrestrial radio access (E-UTRA) cell.

16. The method of claim 13, wherein the base station corresponds to a first base station, and wherein the method further comprises:

receive, from the base station, a control message for addition of a second base station supporting the second cell.

17. The method of claim 16, further comprising:

receiving, from the base station, a control message for releasing the first cell.

18. The method of claim 13, wherein the first communication protocol is a 4long-term evolution (LTE), and wherein the second communication protocol is a new radio (NR).

* * * * *